(12) United States Patent
Yamakawa

(10) Patent No.: US 8,739,069 B2
(45) Date of Patent: May 27, 2014

(54) IMAGE PROCESSING APPARATUS, IMAGE PROCESSING METHOD, IMAGE SENSING APPARATUS, AND RECORDING MEDIUM

(75) Inventor: Kanako Yamakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 12/428,528

(22) Filed: Apr. 23, 2009

(65) Prior Publication Data
US 2009/0276731 A1    Nov. 5, 2009

(30) Foreign Application Priority Data

May 2, 2008 (JP) ................................ 2008-120762

(51) Int. Cl.
*G06F 3/048* (2013.01)

(52) U.S. Cl.
USPC ......................................................... 715/833

(58) Field of Classification Search
USPC ......................................................... 715/833
See application file for complete search history.

(56) References Cited

U.S. PATENT DOCUMENTS

| | | | |
|---|---|---|---|
| 6,115,037 A * | 9/2000 | Sumiyoshi et al. ............ | 715/726 |
| 2001/0027791 A1 * | 10/2001 | Wallace et al. ........... | 128/204.21 |
| 2003/0103234 A1 * | 6/2003 | Takabayashi et al. ....... | 358/1.15 |
| 2005/0108645 A1 * | 5/2005 | Prentice et al. ............... | 715/722 |
| 2008/0062442 A1 | 3/2008 | Olson | |
| 2011/0129148 A1 * | 6/2011 | Kisilev et al. ................. | 382/167 |

FOREIGN PATENT DOCUMENTS

| | | |
|---|---|---|
| JP | 05-210479 A | 8/1993 |
| JP | 10-301475 A | 11/1998 |
| JP | 11-032227 A | 2/1999 |
| JP | 2004-080401 A | 3/2004 |
| JP | 2004-080549 A | 3/2004 |
| JP | 2004-325818 | 11/2004 |
| JP | 2007-036592 A | 2/2007 |
| JP | 2007-194939 A | 8/2007 |

OTHER PUBLICATIONS

Fuller et al., Photoshop CS3 Bible, Jul. 10, 2007, John Wiley & Sons, pp. 1, 581-82.*
Voxengo Overtone GEQ User Guide, pp. 1-7, 2007, also available online at http://www.voxengo.com/files/userguides/VoxengoOvertoneGEQ_en.pdf/getbyname/Voxengo%20Overtone%20GEQ%20User%20Guide%20en.pdf.*
"PhotoShop Color Correction," (hereinafter "Photoshop"), archived Dec. 27, 2007, available online at http://web.archive.org/web/20071227222809/http://www.awdsf.com/courseware/photoshop/ps3_color_correction.htm.*
The above references were cited in a Aug. 27, 2012 Japanese Office Action, that issued in Japanese Patent Application No. 2008-120762, an English Translation of the office action is enclosed.

* cited by examiner

*Primary Examiner* — Boris Pesin
*Assistant Examiner* — Matthew Ell
(74) *Attorney, Agent, or Firm* — Cowan, Liebowitz & Latman, P.C.

(57) ABSTRACT

The present invention provides an image processing apparatus including a slider display unit configured to display, on a slider bar, a slider used to change an adjustment value used upon execution of image processing of image data, a thumbnail display unit configured to display a plurality of thumbnail images which respectively indicate results of image processing of the image data using a plurality of different target values, a selection unit configured to select at least one of the plurality of thumbnail images, and a target value display unit configured to display a position indicating the target value corresponding to the thumbnail image on the slider bar to be discriminated from the slider.

10 Claims, 26 Drawing Sheets

F I G. 15
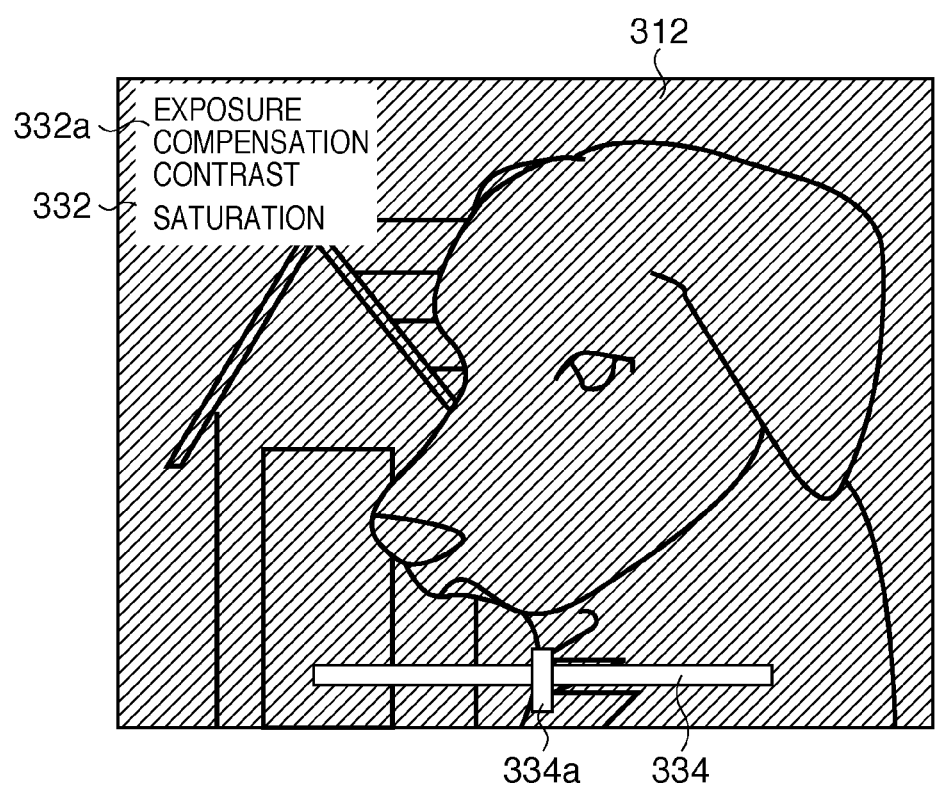

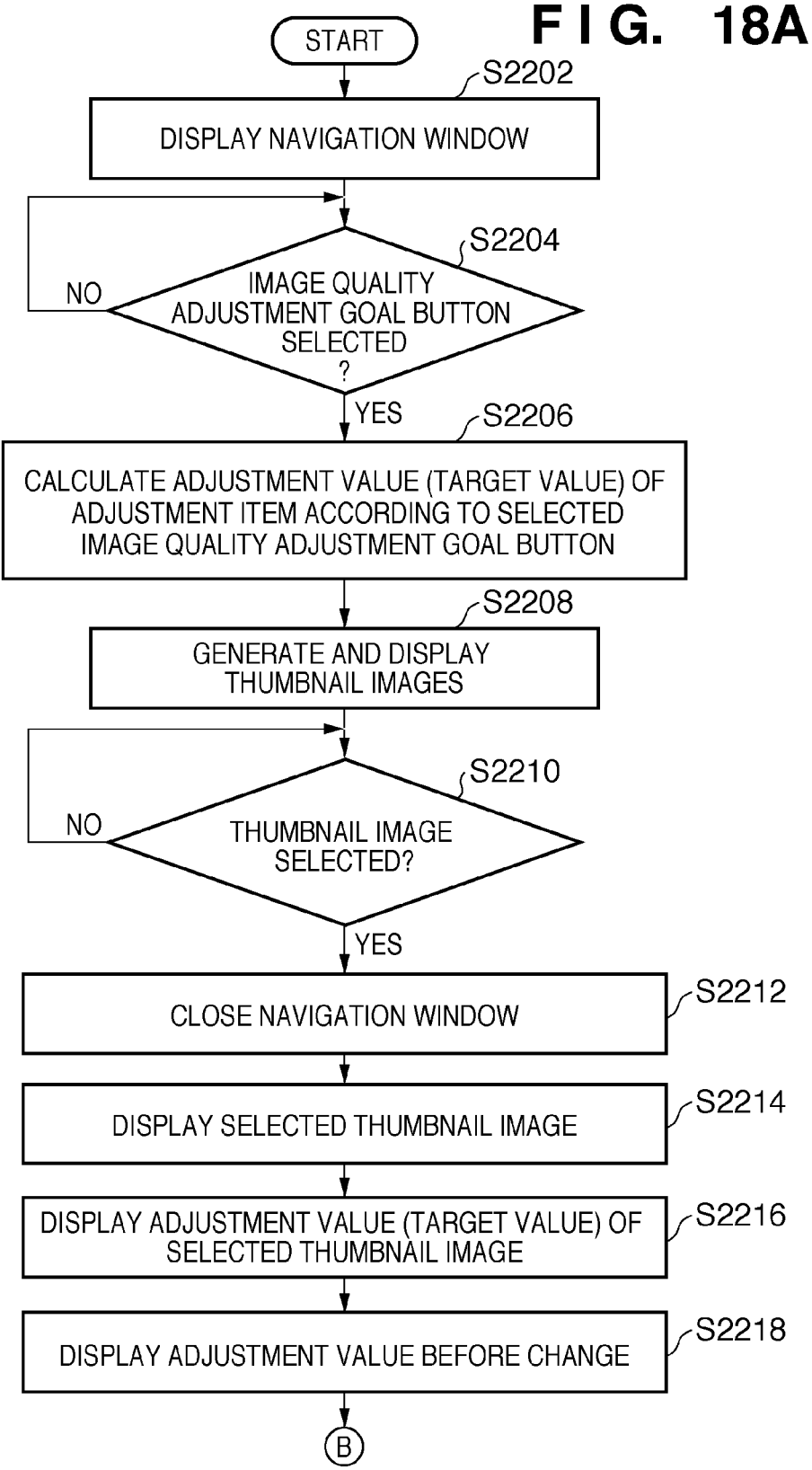

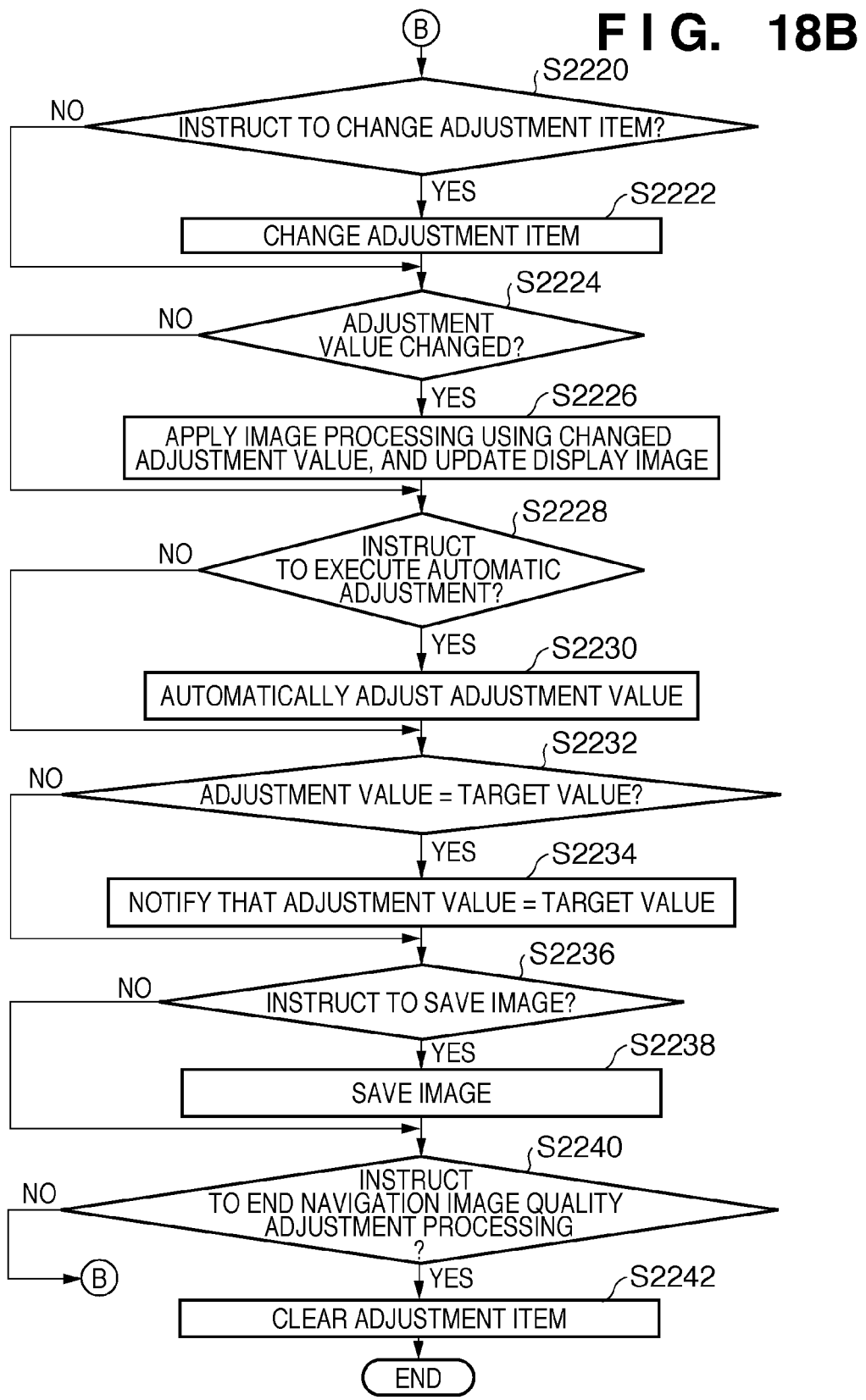

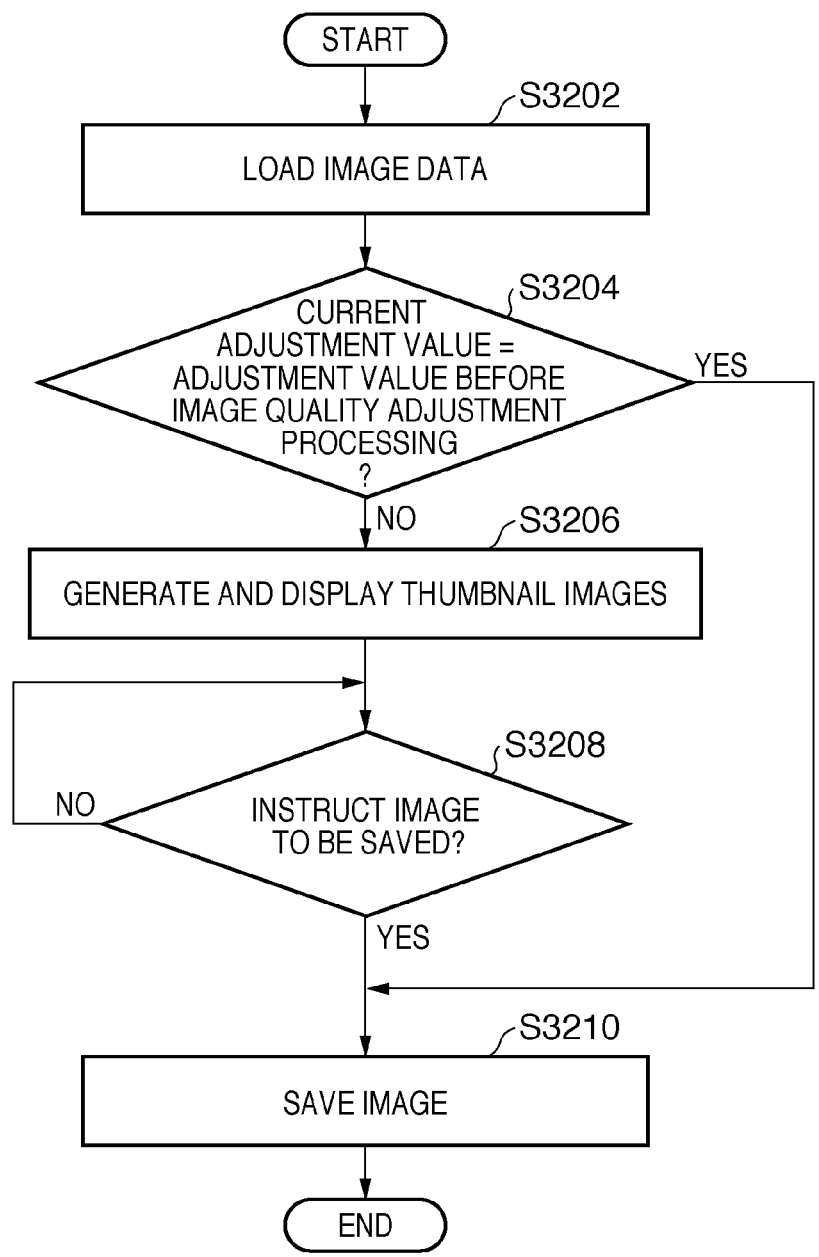

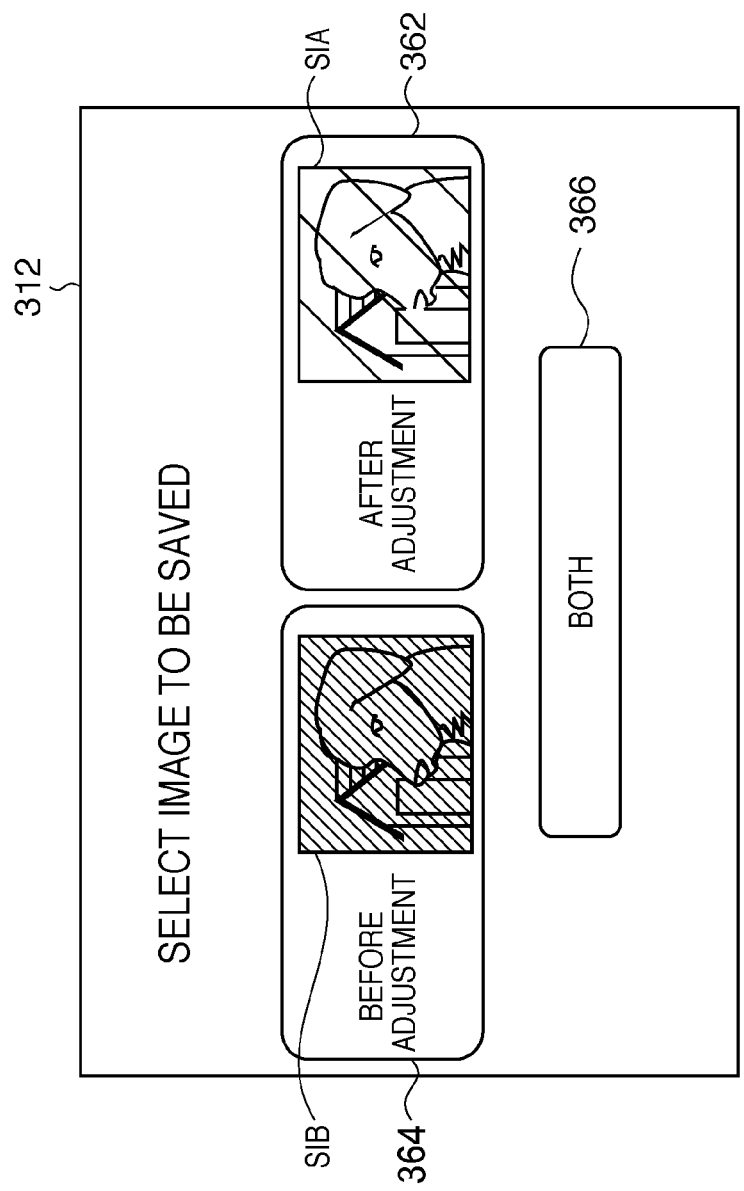

F I G. 27B
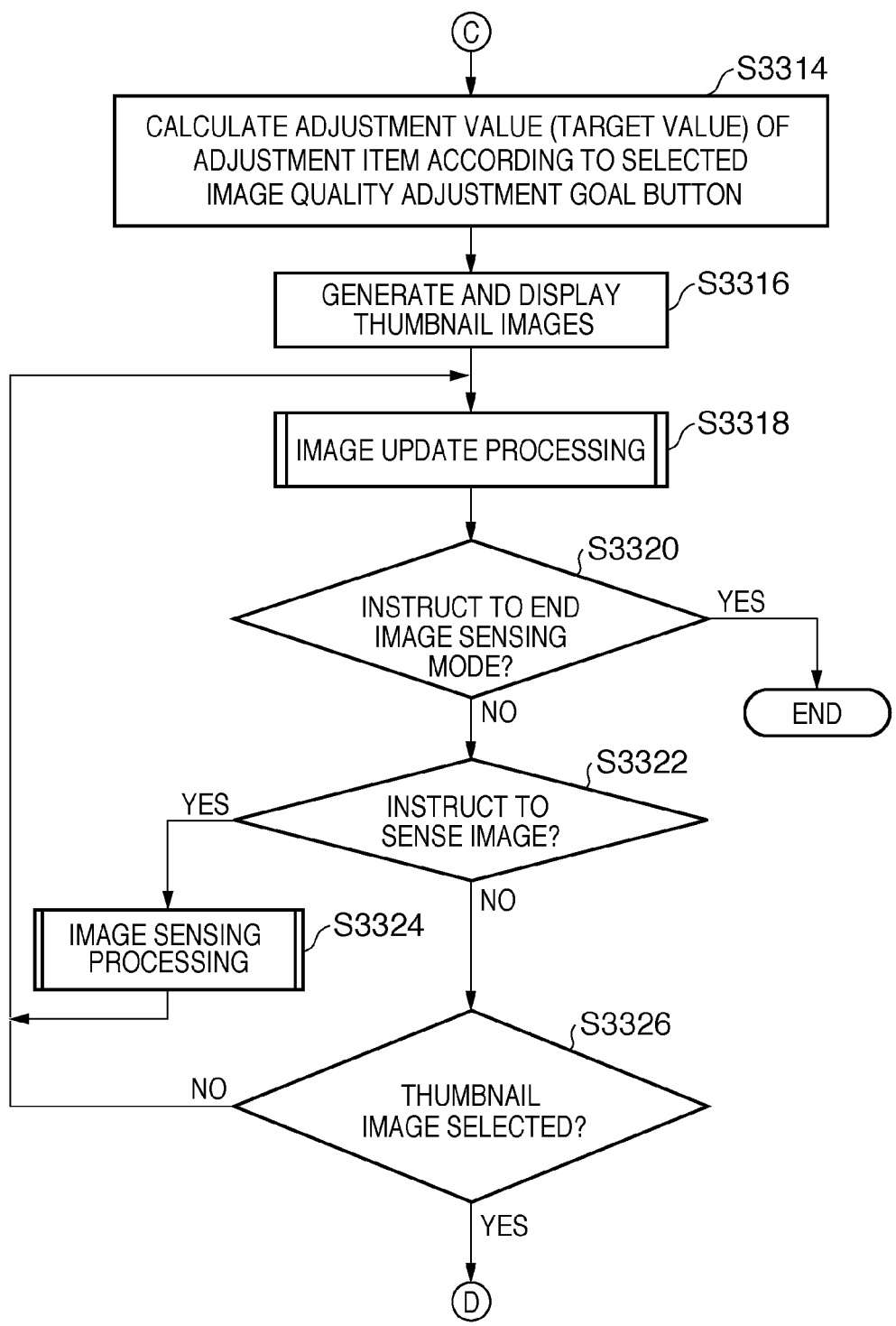

IMAGE PROCESSING APPARATUS, IMAGE PROCESSING METHOD, IMAGE SENSING APPARATUS, AND RECORDING MEDIUM

BACKGROUND OF THE INVENTION

1. Field of the Invention

The present invention relates to an image processing apparatus, image processing method, image sensing apparatus, and recording medium.

2. Description of the Related Art

In order to change the adjustment values of a plurality of adjustment items upon adjusting the image quality of an image displayed on a display screen, the user has to input numerical values for respective adjustment items using a keyboard or the like, or has to adjust adjustment bars on a GUI displayed on the display screen using a mouse or the like. Since the image displayed on the display screen changes according to a change in adjustment value every time the adjustment value of each adjustment item is changed, the user has to adjust the image quality depending on the image displayed on the display screen. Since which adjustment values of the adjustment items were changed for how much are not displayed (i.e., they cannot be recognized), when the user wants to, for example, return to the adjustment values before change, he or she has to memorize or record the adjustment values before change.

To solve this problem, Japanese Patent Laid-Open No. 2004-325818 proposes a technique which displays the changed adjustment items in a color different from that of those before change and also the adjustment values before change and those after change (current adjustment values) together upon display a list of adjustment values of the adjustment items. According to this technique, the user can confirm the changed adjustment items and adjustment values at a glance, and can easily decide the adjustment items to be changed upon image quality adjustment.

However, with the aforementioned related art, in order to grasp a change in image quality after the adjustment values of the adjustment items are changed (how the image quality of an image displayed on the display screen changes after which adjustment values of the adjustment items are changed for how much), the user has to repeatedly change the adjustment values. Therefore, the user inexperienced in adjustment of the image quality of an image cannot easily and efficiently adjust the image quality of an image displayed on the display screen.

SUMMARY OF THE INVENTION

The present invention provides a technique which allows even a user inexperienced in adjustment of the image quality of an image to easily and efficiently accomplish it.

According to one aspect of the present invention, there is provided an image processing apparatus including a slider display unit configured to display, on a slider bar, a slider used to change an adjustment value used upon execution of image processing of image data, a thumbnail display unit configured to display a plurality of thumbnail images which respectively indicate results of image processing of the image data using a plurality of different target values, a selection unit configured to select at least one of the plurality of thumbnail images, and a target value display unit configured to display a position indicating the target value corresponding to the thumbnail image on the slider bar to be discriminated from the slider.

Further features of the present invention will become apparent from the following description of exemplary embodiments with reference to the attached drawings.

BRIEF DESCRIPTION OF THE DRAWINGS

FIG. 15 is a view showing an example of a plurality of adjustment items which are displayed on an image displayed on a display unit in step S2008 in FIG. 14;

FIGS. 18A and 18B are flowcharts for explaining navigation image quality adjustment processing in step S2014 in FIG. 14.

FIG. 25 is a flowchart for explaining image sensing processing in steps S3008 and S3020 in FIGS. 23A and 23B.

FIG. 26 is a view showing an example of thumbnail images displayed on the display unit in step S3206 in FIG. 25.

FIGS. 27A to 27D are flowcharts for explaining navigation image quality adjustment processing in step S3024 in FIG. 23B.

DESCRIPTION OF THE EMBODIMENTS

Figure 1:
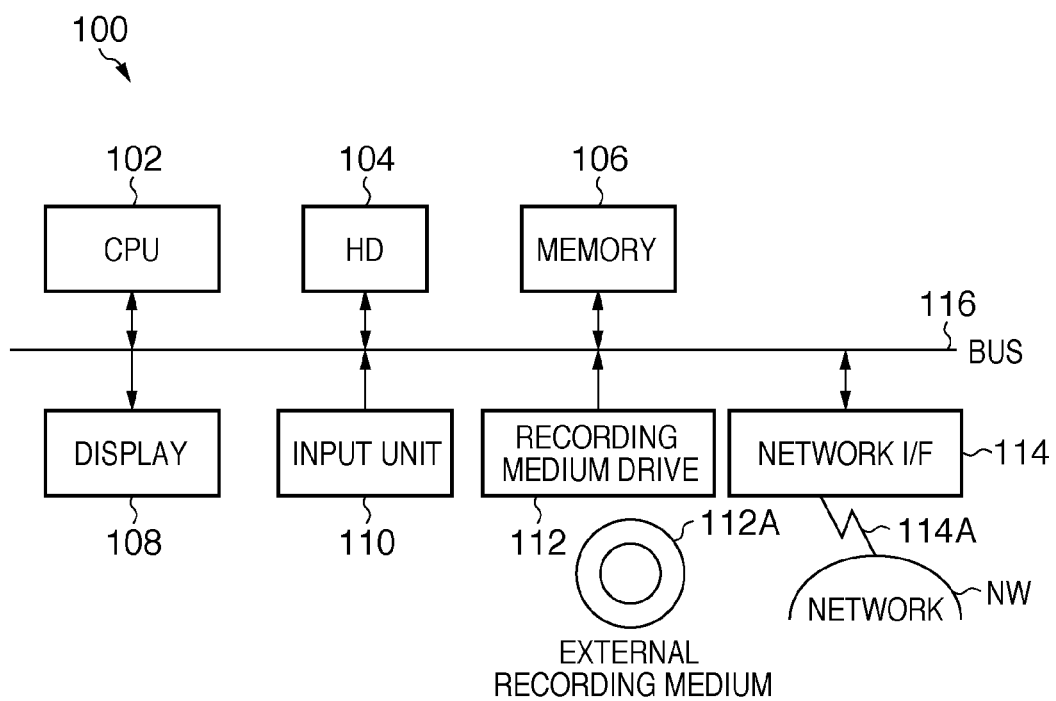
FIG. 1 is a block diagram showing the arrangement of an image processing apparatus according to the first embodiment of the present invention.

Preferred embodiments of the present invention will be described hereinafter with reference to the accompanying drawings. Note that the same reference numerals denote the same parts throughout the drawings, and a repetitive description thereof will be avoided.

First Embodiment

FIG. 1 is a block diagram showing the arrangement of an image processing apparatus 100 according to the first embodiment of the present invention. The image processing apparatus 100 includes a central processing unit (CPU) 102, hard disk (HD) 104, memory 106, display 108, input unit 110, recording medium drive 112, network interface (I/F) 114, and bus 116.

The CPU 102 controls the operation of the image processing apparatus 100. The CPU 102 executes, for example, programs recorded in the HD 104 and the like.

The HD 104 records programs (for example, an image processing program) and digital data such as image data. In this embodiment, each image data is that in the RAW format (RAW image data), and is appended with adjustment values required upon execution of RAW development (adjustment and output processing). The RAW development applies image processing to RAW image data using set (adjusted) adjustment values. However, image data is not limited to that in the RAW format, and may be those in formats other than the RAW format.

The memory 106 is a main memory used as a work area of the CPU 102.

The display 108 is a display unit including a display screen that displays an image corresponding to image data and characters.

The input unit 110 includes various input devices such as a keyboard and mouse (pointing device) in this embodiment. The user can adjust the image quality of an image displayed on the display 108 (i.e., can execute an image processing program) using the input unit 110.

The recording medium drive 112 is a device which reads out data stored in an external recording medium 112A such as a CD-ROM or DVD-ROM, or writes data in the external recording medium 112A. In this embodiment, programs are recorded in the HD 104. Alternatively, the CPU 102 may execute programs recorded in the external recording medium 112A via the recording medium drive 112.

The network I/F 114 is connected to a network NW via a communication line 114A. In this embodiment, programs are recorded in the HD 104, as described above. Alternatively, the CPU 102 may execute programs on the network NW via the network I/F 114 and communication line 114A.

The bus 116 is an internal bus which connects the CPU 102, HD 104, memory 106, display 108, input unit 110, recording medium drive 112, and network I/F 114.

Note that functions to be described below are implemented when the CPU 102 controls other modules in accordance with the image processing program of this embodiment and an OS recorded in the HD 104.

Figure 2:
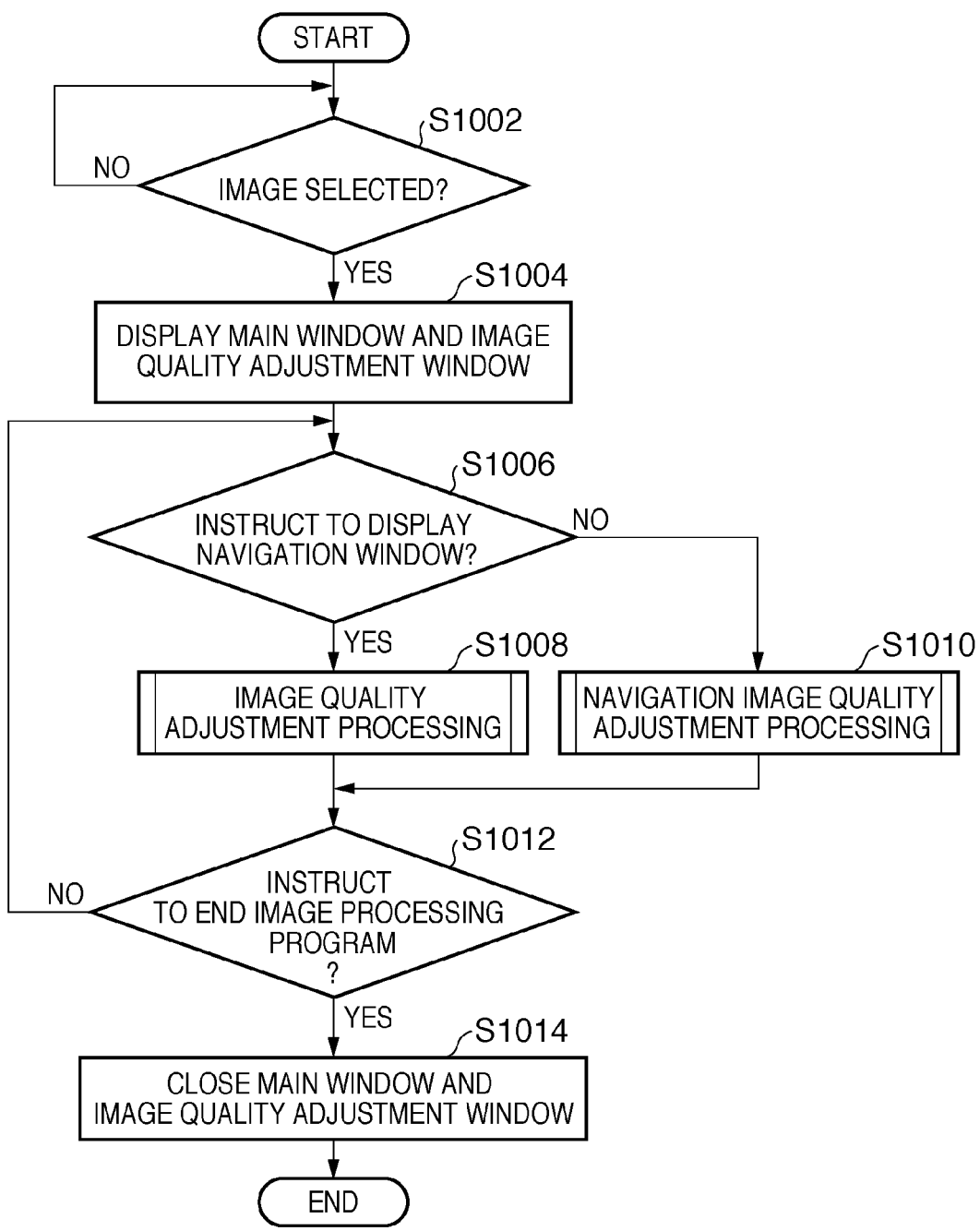
FIG. 2 is a flowchart for explaining image processing in the image processing apparatus shown in FIG. 1.

The operation of image processing (image processing program) in the image processing apparatus 100 will be described below. The image processing in the image processing apparatus 100 is executed when the CPU 102 systematically controls the respective units of the image processing apparatus 100. In this embodiment, assume that the image processing program is launched, and an image selection dialog that allows the user to a processing target image, the image quality of which is to be adjusted, is displayed on the display 108. FIG. 2 is a flowchart for explaining the image processing in the image processing apparatus 100.

The CPU 102 determines in step S1002 whether or not the user selects a processing target image, the image quality of which is to be adjusted (i.e., whether or not he or she inputs an image selection instruction on the image selection dialog). If a processing target image, the image quality of which is to be adjusted, is not selected, the CPU 102 waits until the user selects a processing target image, the image quality of which is to be adjusted. On the other hand, if a processing target image, the image quality of which is to be adjusted, is selected, the process advances to step S1004.

Figure 3:
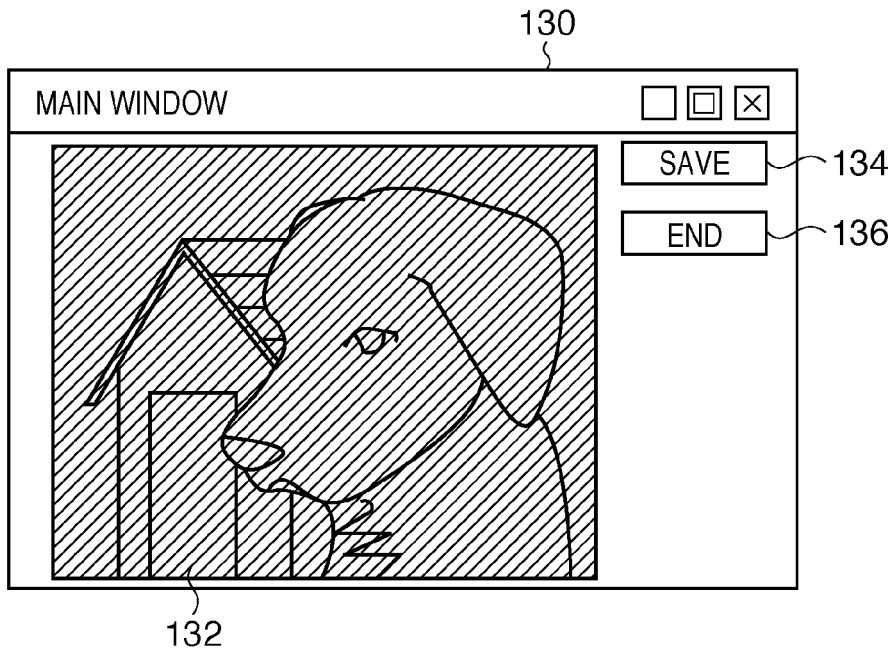
FIG. 3 is a view showing an example of a main window displayed on a display in step S1004 in FIG. 2.
Figure 4:
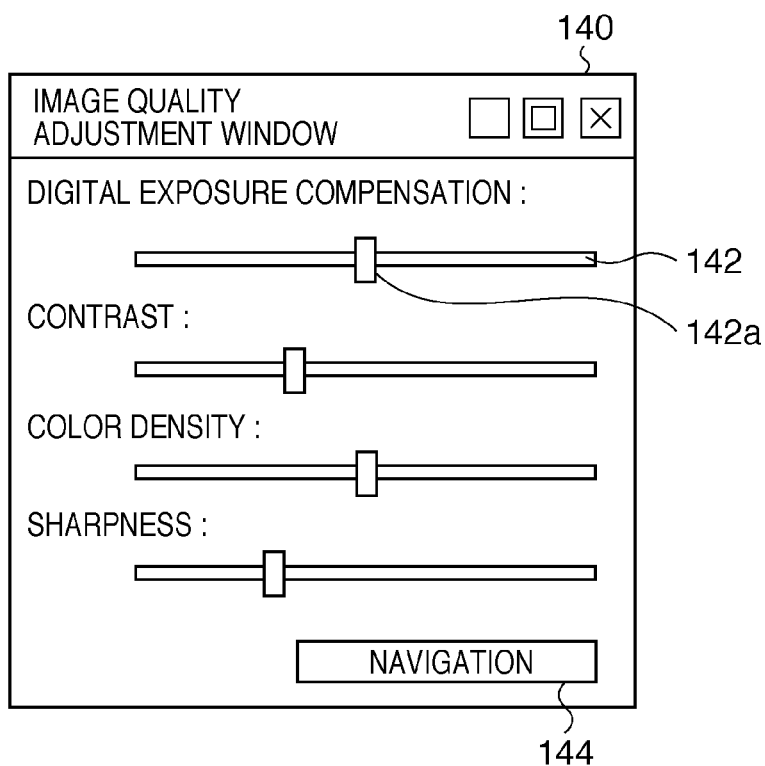
FIG. 4 is a view showing an example of an image quality adjustment window displayed on the display in step S1004 in FIG. 2.

In step S1004, the CPU 102 displays a main window 130 shown in FIG. 3 and an image quality adjustment window 140 shown in FIG. 4 on the display 108. FIG. 3 is a view showing an example of the main window 130 displayed on the display 108 in step S1004. FIG. 4 is a view showing an example of the image quality adjustment window 140 displayed on the display 108 in step S1004.

As shown in FIG. 3, the main window 130 includes a display area 132 for displaying a processing target image, the image quality of which is to be adjusted, a save button 134 used to give the instruction to save an image, and an end button 136 used to give the instruction to end the image processing program.

As shown in FIG. 4, the image quality adjustment window 140 includes image quality adjustment controllers 142 used to adjust the image quality of an image displayed on the display area 132 of the main window 130 in correspondence with a plurality of adjustment items. In this embodiment, the plurality of adjustment items include digital exposure compensation, contrast, color density, and sharpness, and may also include adjustment items required to form an image such as white balance and saturation. In this embodiment, each image quality adjustment controller 142 is displayed as a slider, but may be a radio button, check box, combo box, button, or the like. An adjustment value 142a on each image quality adjustment controller 142 is initially set based on adjustment value information included in image data. When image data does not include any adjustment value information, the adjustment value 142a on each image quality adjustment controller 142 is initially set based on image information. The image quality adjustment window 140 includes a navigation button 144 used to instruct to display a navigation window (to be described later).

The CPU 102 determines in step S1006 whether or not the user gives the instruction to display a navigation window, that is, whether or not he or she presses (selects) the navigation button 144 on the image quality adjustment window 140 in this embodiment. If the user does not give the instruction to display the navigation window, the process advances to step S1008 to execute image quality adjustment processing without using the navigation window. On the other hand, if the user gives the instruction to display the navigation window, the process advances to step S1010 to execute image quality adjustment processing using the navigation window (navigation image quality adjustment processing). Note that the image quality adjustment processing in step S1008 and the navigation image quality adjustment processing in step S1010 will be described in detail later.

The CPU 102 determines in step S1012 whether or not the user gives the instruction to end the image processing program, that is, whether or not he or she presses (selects) the end button 136 of the main window 130 in this embodiment. If the user does not give the instruction to end the image processing program, the process advances to step S1006. On the other hand, if the user gives the instruction to end the image processing program, the process advances to step S1014 to close the main window 130 and image quality adjustment window 140 displayed on the display 108 in step S1004, thus ending the image processing (image processing program).

Figure 5:
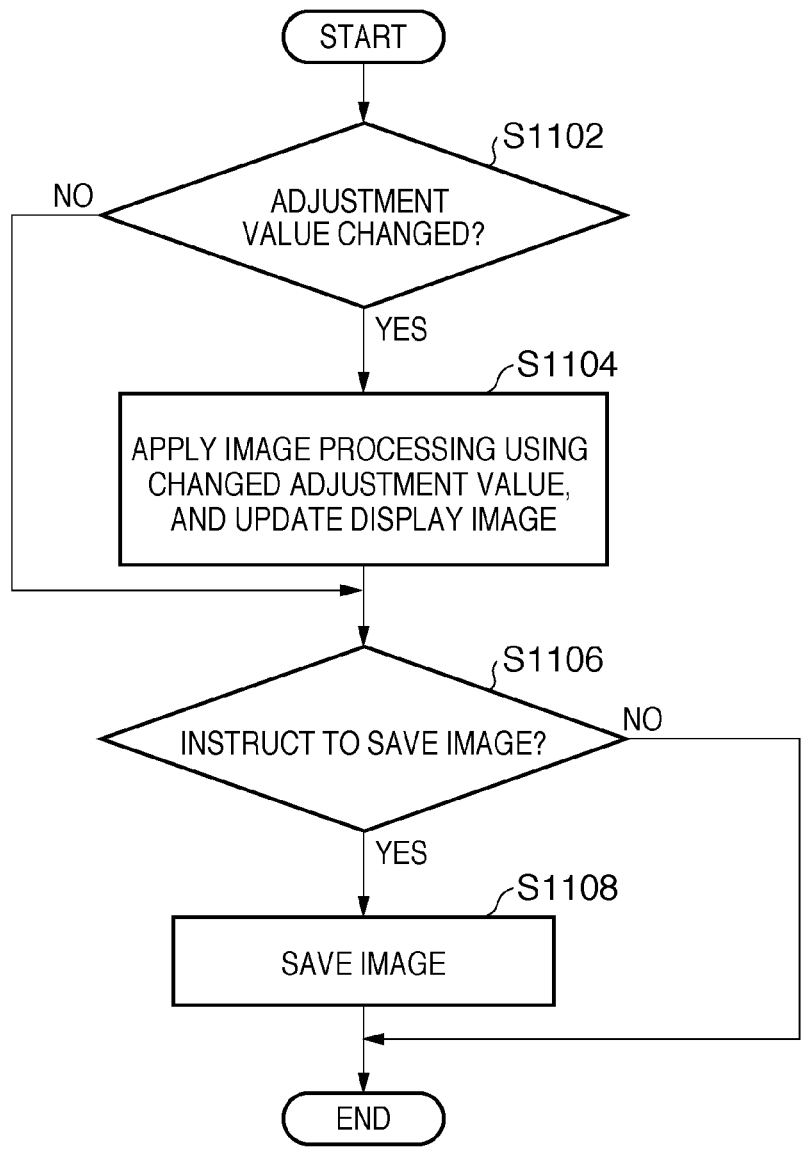
FIG. 5 is a flowchart for explaining image quality adjustment processing in step S1008 in FIG. 2.

The image quality adjustment processing in step S1008 will be described below with reference to FIG. 5.

The CPU 102 determines in step S1102 whether or not the user changes the adjustment values 142a on the image quality adjustment controllers 142 on the image quality adjustment window 140, that is, whether or not sliders (142a) corresponding to the adjustment values are moved on slider bars (142) in response to a user's operations. The adjustment value of each adjustment item is decided in correspondence with the position of the slider on the slider bar. If the user changes the adjustment values 142a on the image quality adjustment controllers 142 on the image quality adjustment window 140, the process advances to step S1104. On the other hand, if the user does not change the adjustment values 142a on the image quality adjustment controllers 142 on the image quality adjustment window 140, the process jumps to step S1106.

In step S1104, the CPU 102 loads RAW image data as a processing target, the image quality of which is to be adjusted, applies image processing using the adjustment values changed in step S1102, and updates an image displayed on the display area 132 on the main window 130. The image processing will be practically explained below taking, as an example, a case in which the adjustment value of digital exposure compensation is changeable within the range from −2 to +2, and can be set (changed) in increments/decrements of 0.1 within this range. The RGB values of RAW image data are converted into luminance values first. When the adjustment value of digital exposure compensation is changed, exposure compensation processing is applied to the luminance values of the RAW image data using the changed adjustment value. The exposure compensation processing result is inversely converted into RGB values to update image information. Note that this embodiment has explained the image processing using luminance values. However, the image processing may be implemented by other methods.

The CPU 102 determines in step S1106 whether or not the user gives the instruction to save the image displayed on the display area 132 on the main window 130, that is, whether or not he or she presses (selects) the save button 134 on the main window 130 in this embodiment. If the user does not give the instruction to save the image displayed on the display area 132 on the main window 130, the CPU 102 ends the image quality adjustment processing in step S1008. On the other hand, if the user gives the instruction to save the image displayed on the display area 132 on the main window 130, the process advances to step S1108.

In step S1108, the CPU 102 saves the image displayed on the display area 132 on the main window 130, and ends the image quality adjustment processing. Upon saving the image, an image save dialog that prompts the user to input a save format and file name is displayed on the display 108, and the image is saved to have the input save format and file name.

Figure 6A:
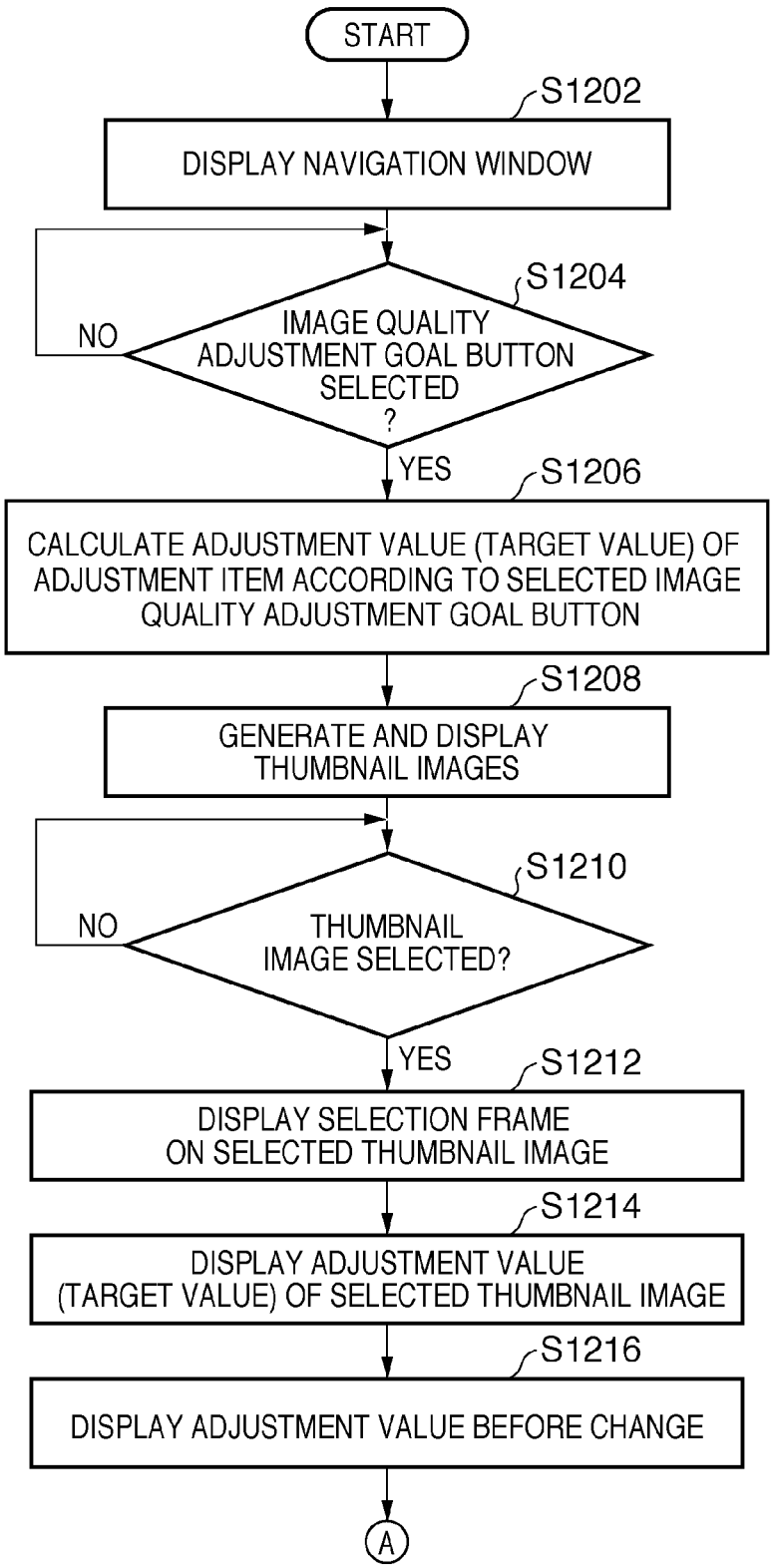
FIGS. 6A and 6B are flowcharts for explaining navigation image quality adjustment processing in step S1010 in FIG. 2.
Figure 6B:
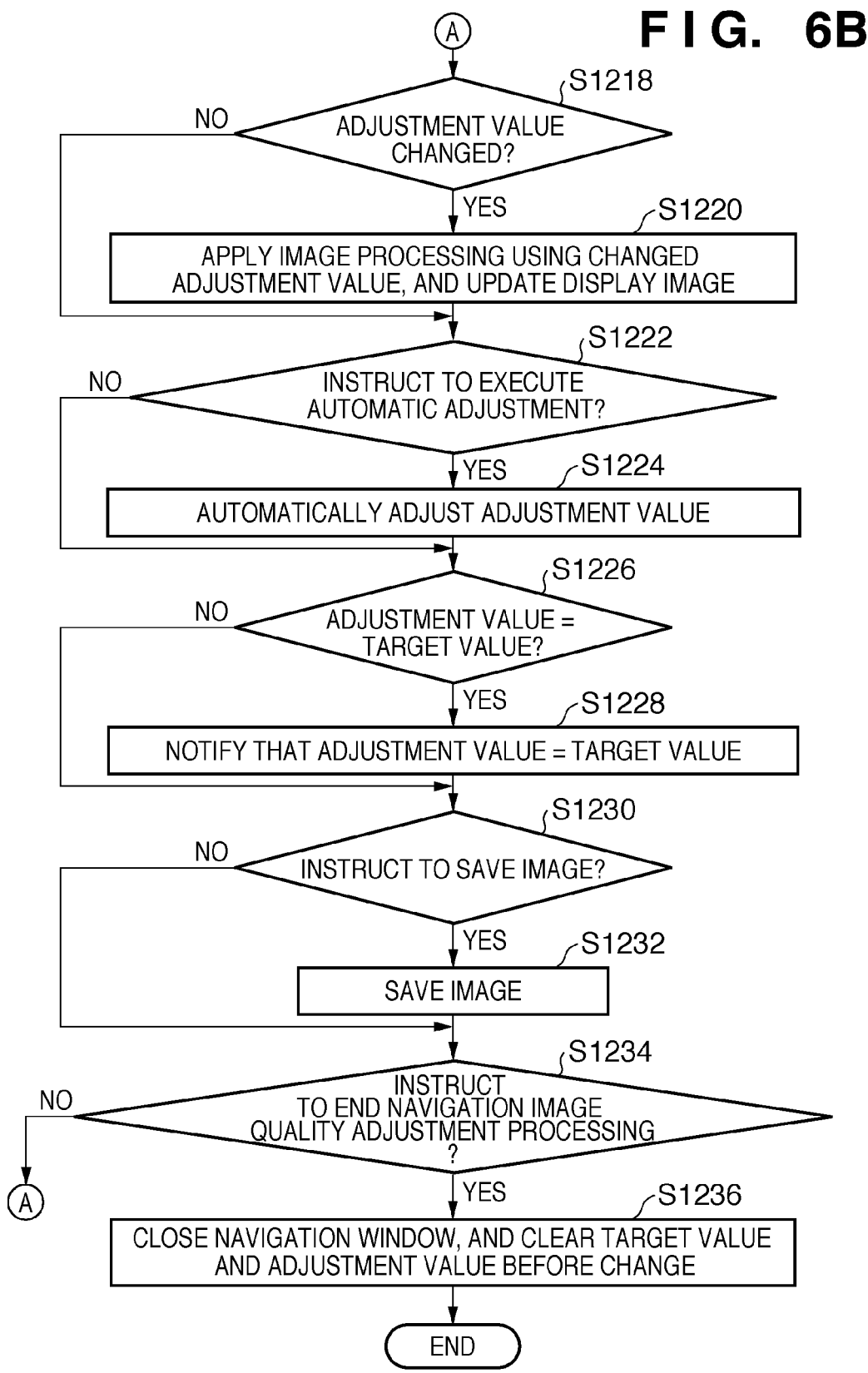

The navigation image quality adjustment processing in step S1010 will be described below with reference to FIGS. 6A and 6B.

Figure 7:
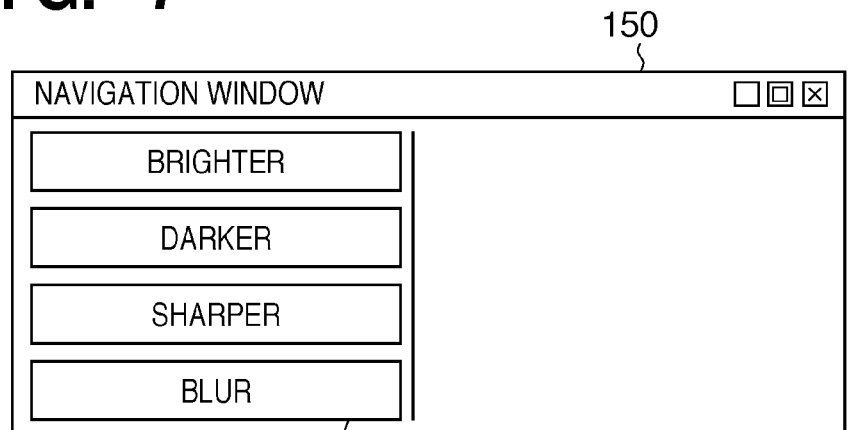
FIG. 7 is a view showing an example of a navigation window displayed on the display in step S1202 in FIG. 6A.

In step S1202, the CPU 102 displays a navigation window 150 shown in FIG. 7 on the display 108. FIG. 7 is a view showing an example of the navigation window 150 displayed on the display 108 in step S1202.

The navigation window 150 includes a plurality of image quality adjustment goal buttons 152 for respective image quality adjustment goals. This embodiment sets four image quality adjustment goals "brighter", "darker", "sharper", and "blur". However, other image quality adjustment goals may be set.

The CPU 102 determines in step S1204 whether or not the user selects one of the image quality adjustment goal buttons 152 on the navigation window 150. If no image quality adjustment goal button 152 on the navigation window 150 is selected, the CPU 102 waits until the user selects one of the image quality adjustment goal buttons 152. On the other hand, if one of the image quality adjustment goal buttons 152 on the navigation window 150 is selected, the process advances to step S1206.

In step S1206, the CPU 102 calculates adjustment values (target values) of the adjustment items according to the image quality adjustment goal button 152 selected in step S1204. This embodiment will explain a case in which the user selects the image quality adjustment goal button 152 "brighter", and the CPU 102 calculates four target values to realize the selected image quality adjustment goal. An image becomes brighter by changing (adjusting) the adjustment values of digital exposure compensation and color density in a plus direction. For example, assuming that the current adjustment values of digital exposure compensation and color density are 0, and the maximum value is +2.0, the CPU 102 calculates adjustment values by equally dividing the interval between 0 and +2.0 into four as four target values, as indicated by the following first, second, third, and fourth target values.

First target value "adjustment value of digital exposure compensation: +0.5, adjustment value of color density: +0.5"

Second target value "adjustment value of digital exposure compensation: +1.0, adjustment value of color density: +1.0"

Third target value "adjustment value of digital exposure compensation: +1.5, adjustment value of color density: +1.5"

Fourth target value "adjustment value of digital exposure compensation: +2.0, adjustment value of color density: +2.0"

In this embodiment, the target values are calculated by equally dividing the interval between the current adjustment value and its maximum or minimum value. Alternatively, for example, image information such as image sensing information may be acquired, and appropriate adjustment values may be automatically calculated as target values. Also, the number of target values calculated in step S1206 is not limited to four. In this embodiment, only one image quality adjustment goal button 152 is selected. Alternatively, a plurality of image quality adjustment goal buttons 152 may be selected, and target values may be compositely calculated from this plurality of image quality adjustment goals.

Figure 8:
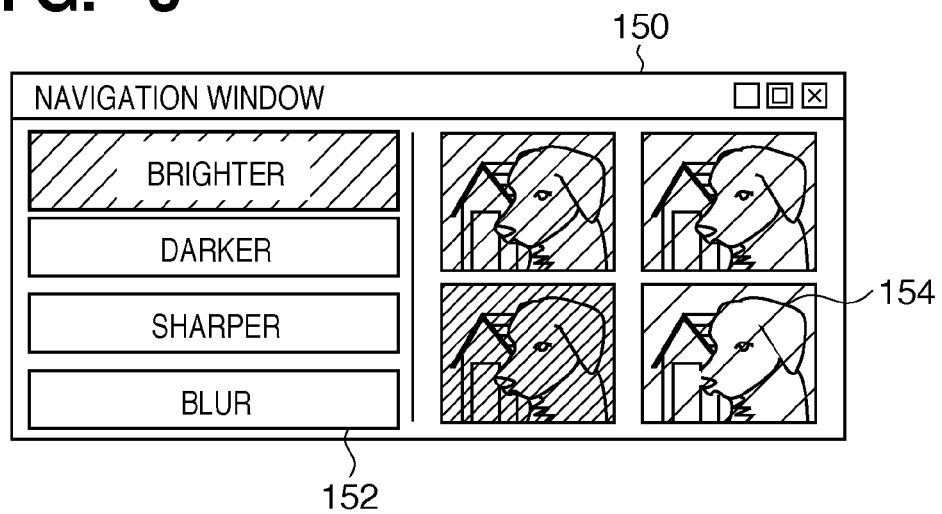
FIG. 8 is a view showing an example of the navigation window displayed on the display in step S1208 in FIG. 6A.

In step S1208, the CPU 102 generates and displays thumbnail images by applying image processing using the adjustment values (target values) of the adjustment items calculated in step S1206 to image data of the image displayed on the display area 132 on the main window 130. More specifically, as shown in FIG. 8, the CPU 102 displays thumbnail images on a thumbnail display area 154 on the navigation window 150. In FIG. 8, thumbnail images are generated in correspondence with the four target values (first, second, third, and fourth target values), and are displayed on the thumbnail display area 154. FIG. 8 is a view showing an example of the navigation window 150 displayed on the display 108 in step S1208.

The CPU 102 determines in step S1210 whether or not the user selects one of the plurality of thumbnail images displayed on the thumbnail display area 154 on the navigation window 150 in step S1208. If the user does not select any thumbnail image, the CPU 102 waits until he or she selects a thumbnail image. If the user selects one thumbnail image, the process advances to step S1212.

Figure 9:
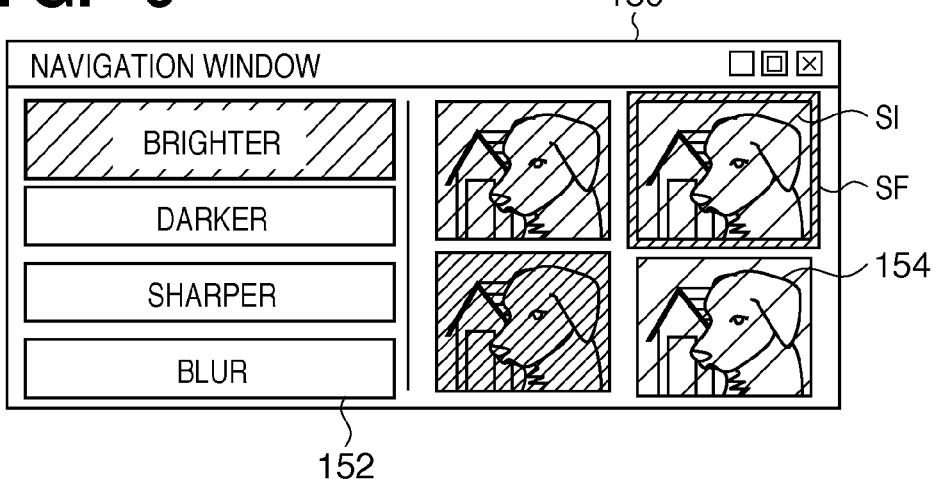
FIG. 9 is a view showing an example of the navigation window displayed on the display in step S1212 in FIG. 6A.

In step S1212, the CPU 102 displays a selection frame SF around a selected thumbnail image SI of the plurality of thumbnail images displayed on the thumbnail display area 154 on the navigation window 150, as shown in FIG. 9. In this embodiment, the selection frame SF is displayed so as to distinguish the selected thumbnail image SI from the plurality of thumbnail images displayed on the thumbnail display area 154 on the navigation window 150. However, the selected thumbnail image SI may be distinguished by other methods. FIG. 9 is a view showing an example of the navigation window 150 displayed on the display 108 in step S1212.

Figure 10:
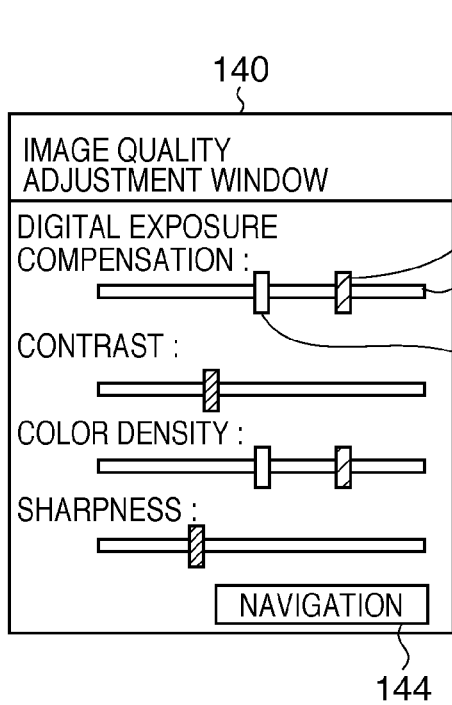
FIG. 10 is a view showing an example of the image quality adjustment window displayed on the display in step S1214 in FIG. 6A.

In step S1214, the CPU 102 displays (clearly expresses) adjustment values (target values) 142b of the selected thumbnail image SI to be discriminated from the current adjustment values 142a on the image quality adjustment controllers 142 on the image quality adjustment window 140, as shown in FIG. 10. That is, the CPU 102 displays the sliders (142a) located at positions corresponding to the current adjustment values, and marks (142b) located at positions corresponding to the target values to have different display styles, so that the user can easily identify them. Note that the selection frame SF of the selected thumbnail image SI and the adjustment values (target values) 142b of the selected thumbnail image SI on the image quality adjustment controllers 142 are displayed to have the same color and are associated with each other. When a plurality of thumbnail images is selected, the selection frames SF and adjustment values (target values) 142b are displayed to have different colors for respective thumbnail images. In this embodiment, in order to associate the selected thumbnail image SI (selection frame SF) with the adjustment values (target values) 142b, the selection frame SF and adjustment values (target values) 142b are displayed to have the same color. Alternatively, they may be associated with each other by appending the same mark. In this embodiment, the adjustment values (target values) 142b are displayed (explicitly expressed) by the marks. Alternatively, for example, the adjustment values (target values) 142b may be flickered or displayed (explicitly expressed) translucently. Note that FIG. 10 is a view showing an example of the image quality adjustment window 140 displayed on the display 108 in step S1214.

Figure 11:
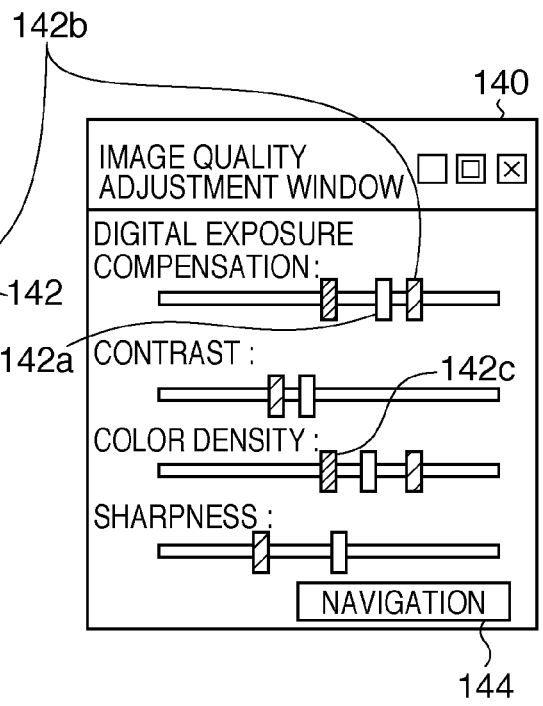
FIG. 11 is a view showing an example of the image quality adjustment window displayed on the display in step S1216 in FIG. 6A.

In step S1216, the CPU 102 displays (explicitly expresses) adjustment values 142c before change to be discriminated from the current adjustment values 142a and adjustment values (target values) 142b of the thumbnail image SI on the image quality adjustment controllers 142 on the image quality adjustment window 140, as shown in FIG. 11. More specifically, the CPU 102 displays the adjustment values 142c before change to have a color different from those of the current adjustment values 142a and adjustment values (target values) 142b of the thumbnail image SI. In this way, the user can change (adjust) the adjustment values of the adjustment items while comparing it with the adjustment values 142c before change and the current adjustment values 142a. Also, the user can revert the adjustment values of the adjustment items to the adjustment values 142c before change without memorizing and recording the adjustment values 142c before change. Note that FIG. 11 is a view showing an example of the image quality adjustment window 140 displayed on the display 108 in step S1216. Note that FIG. 11 shows an example in which the current adjustment values 142a are changed based on the adjustment values (target values) 142b of the thumbnail image SI and the adjustment values 142c before change. However, it should be noted that the current adjustment values 142a and the adjustment values 142c before change overlap each other at the timing of step S1216 (see FIG. 10).

The CPU 102 determines in step S1218 whether or not the user has changed each current adjustment value 142a on the image quality adjustment controller 142 on the image quality adjustment window 140, that is, whether or not the slider (142a) corresponding to that adjustment value has moved on the slider bar (142) in response to a user's operation. The adjustment value of each adjustment item is decided in correspondence with the position of the slider on the slider bar. If the user has not changed the current adjustment value 142a, the process jumps to step S1222. On the other hand, if the user has changed the current adjustment value 142a, the process advances to step S1220.

In step S1220, the CPU 102 loads the RAW image data as the processing target, the image quality of which is to be adjusted, applies image processing to that image data using the adjustment value changed in step S1218, and updates the image displayed on the display area 132 on the main window 130.

The CPU 102 determines in step S1222 whether or not the user instructs automatic adjustment of the adjustment values of the adjustment items, that is, whether or not he or she double-clicks a thumbnail image displayed on the thumbnail display area 154 on the navigation window 150 in this embodiment. If the user does not give the instruction automatic adjustment of the adjustment values of the adjustment items, the process jumps to step S1226. On the other hand, if the user gives the instruction automatic adjustment of the adjustment values of the adjustment items, the process advances to step S1224. Note that in this embodiment, the instruction for automatic adjustment of the adjustment values of the adjustment items is given by double-clicking the thumbnail image. Alternatively, for example, an automatic adjustment button used to give the instruction for the automatic adjustment of the adjustment values of the adjustment items may be provided on the navigation window 150.

In step S1224, the CPU 102 automatically adjusts the adjustment values of the adjustment items. More specifically, the CPU 102 changes (adjusts) the current adjustment values to those (i.e., the adjustment values (target values) of the adjustment items calculated in step S1206) of the thumbnail image double-clicked in step S1222. At this time, the sliders (142a) corresponding to the current adjustment values automatically move to the positions of the marks corresponding to the target values.

The CPU 102 determines in step S1226 whether or not the current adjustment values are equal to the target values. If the current adjustment values are not equal to the target values, the process jumps to step S1230. On the other hand, if the current adjustment values are equal to the target values, the process advances to step S1228.

In step S1228, the CPU 102 notifies the user that the current adjustment values are equal to the target values by, for example, flickering the adjustment values (target values) 142b of the thumbnail image SI on the image quality adjustment controllers 142 on the image quality adjustment window 140. As a result, the user can recognize that the current adjustment values are those with which the same image quality as that of the thumbnail image that has undergone the image processing using these adjustment values can be obtained. Note that the user may receive such notification by displaying a message box indicating that the current adjustment values are equal to the target values on the main window 130, image quality adjustment window 140, or navigation window 150, or by flickering the current adjustment values.

The CPU 102 determines in step S1230 whether or not the user gives the instruction to save the image displayed on the display area 132 on the main window 130, that is, whether or not he or she presses (selects) the save button 134 on the main window 130 in this embodiment. If the user does not give the instruction to save the image displayed on the display area 132 on the main window 130, the process jumps to step S1234. On the other hand, if the user gives the instruction to save the image displayed on the display area 132 on the main window 130, the process advances to step S1232.

In step S1232, the CPU 102 saves the image displayed on the display area 132 on the main window 130. More specifically, the CPU 102 changes the adjustment value information of the image data as the processing target to the current adjustment values changed in this embodiment, and saves the image data as the processing target.

The CPU 102 determines in step S1234 whether or not the user gives the instruction to end the navigation image quality adjustment processing, that is, whether or not he or she presses (selects) the navigation button 144 on the image quality adjustment window 140. If the user does not give the instruction to end the navigation image quality adjustment processing, the process returns to step S1218. On the other hand, if the user gives the instruction to end the navigation image quality adjustment processing, the process advances to step S1236.

In step S1236, the CPU 102 closes the navigation window 150, and clears the adjustment values (target values) 142b of the thumbnail image SI and the adjustment values 142c before change on the image quality adjustment controllers 142 on the image quality adjustment window 140. Then, the CPU 102 ends the navigation image quality adjustment processing.

As described above, according to the first embodiment, the user is navigated through the path of the adjustment items to be adjusted and processing associated with changes of the adjustment values of these adjustment items according to the image quality adjustment goal of the image, and the image quality can be adjusted while relatively comparing the current adjustment values, target values, and adjustment values before change. Therefore, even a user inexperienced in adjustment of the image quality of an image can easily and efficiently accomplish it.

Second Embodiment

Figure 12:
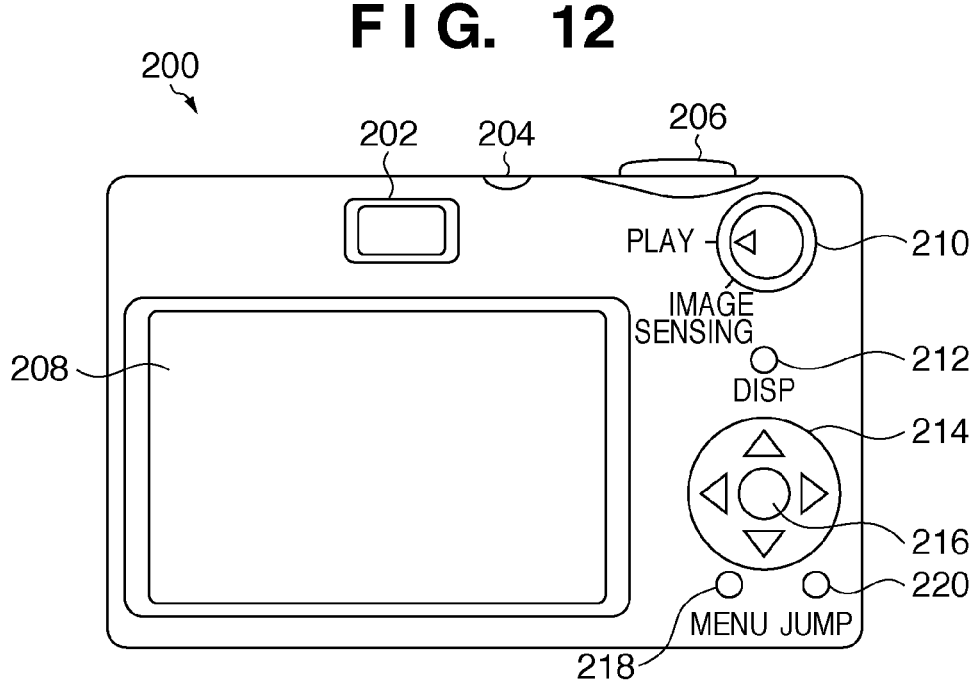
FIG. 12 is a schematic rear view showing an image sensing apparatus according to the second embodiment of the present invention.

FIG. 12 is a schematic rear view of an image sensing apparatus 200 according to the second embodiment of the present invention. The image sensing apparatus 200 is embodied as a digital camera that senses an image of an object. The image sensing apparatus 200 includes, as a user interface, a viewfinder 202, power button 204, shutter button 206, liquid crystal display (LCD) 208, mode dial 210, and display (DISP) button 212. Furthermore, the image sensing apparatus 200 includes, as a user interface, a touch wheel 214, set button 216, menu button 218, and jump button 220. The shutter button 206 is pressed at the time of sensing an image of an object. The LCD 208 is a display unit which displays an image obtained by image sensing (sensed image), a setting screen, and an image and characters corresponding to image data. The mode dial 210 is used to switch between a play mode and image sensing mode.

Figure 13:
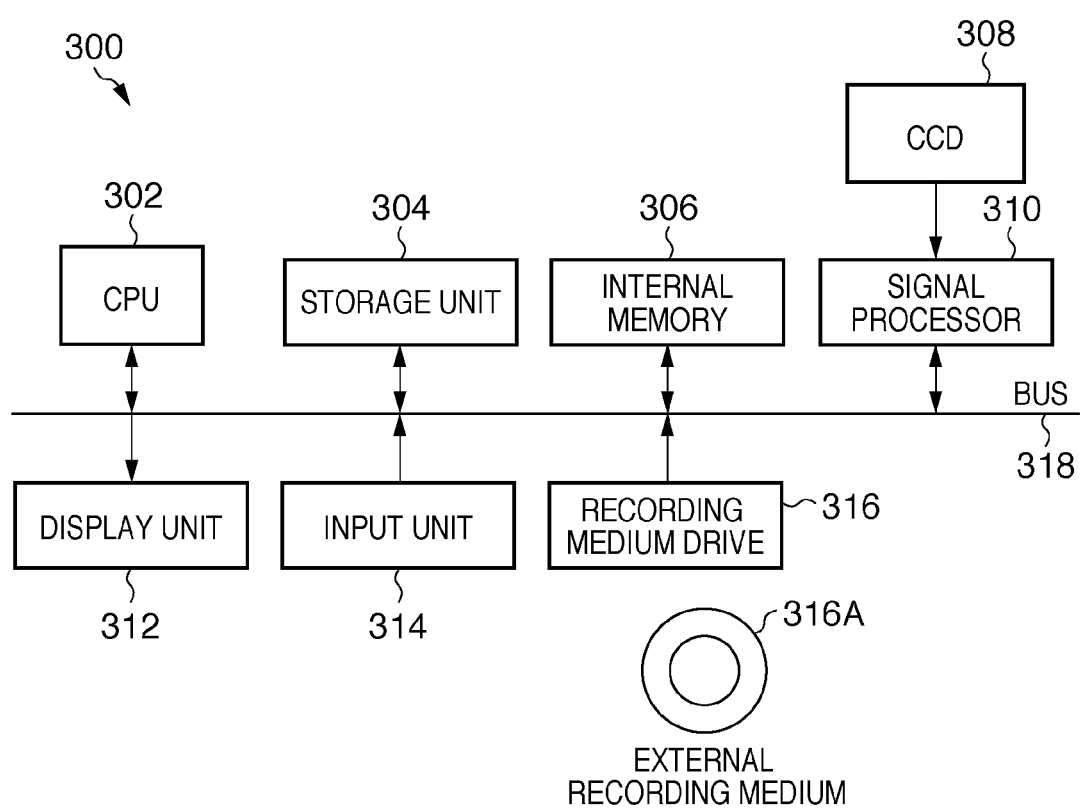
FIG. 13 is a block diagram showing the arrangement of an image processor of the image sensing apparatus shown in FIG. 12.

The image sensing apparatus 200 includes an image processor 300 which applies image processing to an image, as shown in FIG. 13. FIG. 13 is a block diagram showing the arrangement of the image processor 300. The image processor 300 includes a central processing unit (CPU) 302, storage unit 304, internal memory 306, CCD 308, signal processor 310, display unit 312, input unit 314, recording medium drive 316, and bus 318.

The CPU 302 controls the operation of the image processor 300. The CPU 302 executes, for example, programs stored in the storage unit 304 and the like.

The storage unit 304 records programs (for example, an image processing program) and digital data such as image data. In this embodiment, each image data is that in the RAW format (RAW image data), and is appended with adjustment values required upon execution of RAW development (adjustment and output processing). The RAW development is to apply image processing to RAW image data using set (adjusted) adjustment values. However, image data is not limited to that in the RAW format, and may be those in formats other than the RAW format. Note that the storage unit 304 may be fixed to the image sensing apparatus 200 or may be detachably attached to the image sensing apparatus 200.

Note that the storage unit 304 may receive and record programs, data, and the like from another apparatus connected via a communication line or the like. The CPU 302 may use programs, data, and the like recorded in a storage unit of another apparatus via a communication line or the like.

The internal memory 306 is used as a work area of the CPU 302.

The CCD 308 is an image sensing element which converts a sensed image of an object into an electrical signal, and outputs the electrical signal.

The signal processor 310 converts the electrical signal output from the CCD 308 into image data.

The display unit 312 corresponds to the LCD 208 shown in FIG. 12, and a detailed description thereof will not be given.

The input unit 314 includes various input devices such as a keyboard and mouse (pointing device) in this embodiment.

The recording medium drive 316 reads out data stored in an external recording medium 316A such as a semiconductor memory, magnetic disk, optical disk, magneto-optical disk, or IC card, or writes data in the external recording medium 316A. In this embodiment, the programs are recorded in the storage unit 304. Alternatively, programs recorded in the external recording medium 316A may be executed by the CPU 302 via the recording medium drive 316.

The bus 318 is an internal bus which connects the CPU 302, storage unit 304, internal memory 306, signal processor 310, display unit 312, input unit 314, and recording medium drive 316.

Note that the image processing program of this embodiment recorded in the storage unit 304 makes respective components of the image processor 300 serve as an image display unit, image quality adjustment unit, input unit, calculation unit, and control unit. The image display unit displays an image on a display screen. The image quality adjustment unit adjusts the image quality of the image displayed on the display screen by the image display unit based on the adjustment values of a plurality of adjustment items. The input unit allows the user to input an adjustment goal of the image quality of the image displayed on the display screen. The calculation unit calculates a target value as a target of each of the adjustment values of the plurality of adjustment items based on the adjustment goal input using the input unit. The control unit controls the image display unit to display the current adjustment value and target value on the display screen, so as to discriminate the current adjustment value of the image displayed on the display screen from the target value calculated by the calculation unit.

The image processing program of this embodiment recorded in the storage unit 304 makes the respective components of the image processor 300 serve as a change unit, generation unit, display unit, selection unit, acquisition unit, and notification unit. The change unit changes the adjustment values of the plurality of adjustment items. The generation unit generates a plurality of thumbnail images by applying image processing using a plurality of target values calculated by the calculation unit to the image displayed on the display screen. The display unit displays the plurality of thumbnail images generated by the generation unit on the display screen. The selection unit prompts the user to select one of the plurality of thumbnail images displayed by the display unit. The acquisition unit acquires each of the adjustment values of the plurality of adjustment items of the thumbnail image selected by the selection unit. The notification unit notifies the user when the change unit changes each of the adjustment values of the plurality of adjustment items of the image displayed on the display screen to the target value.

Figure 14:
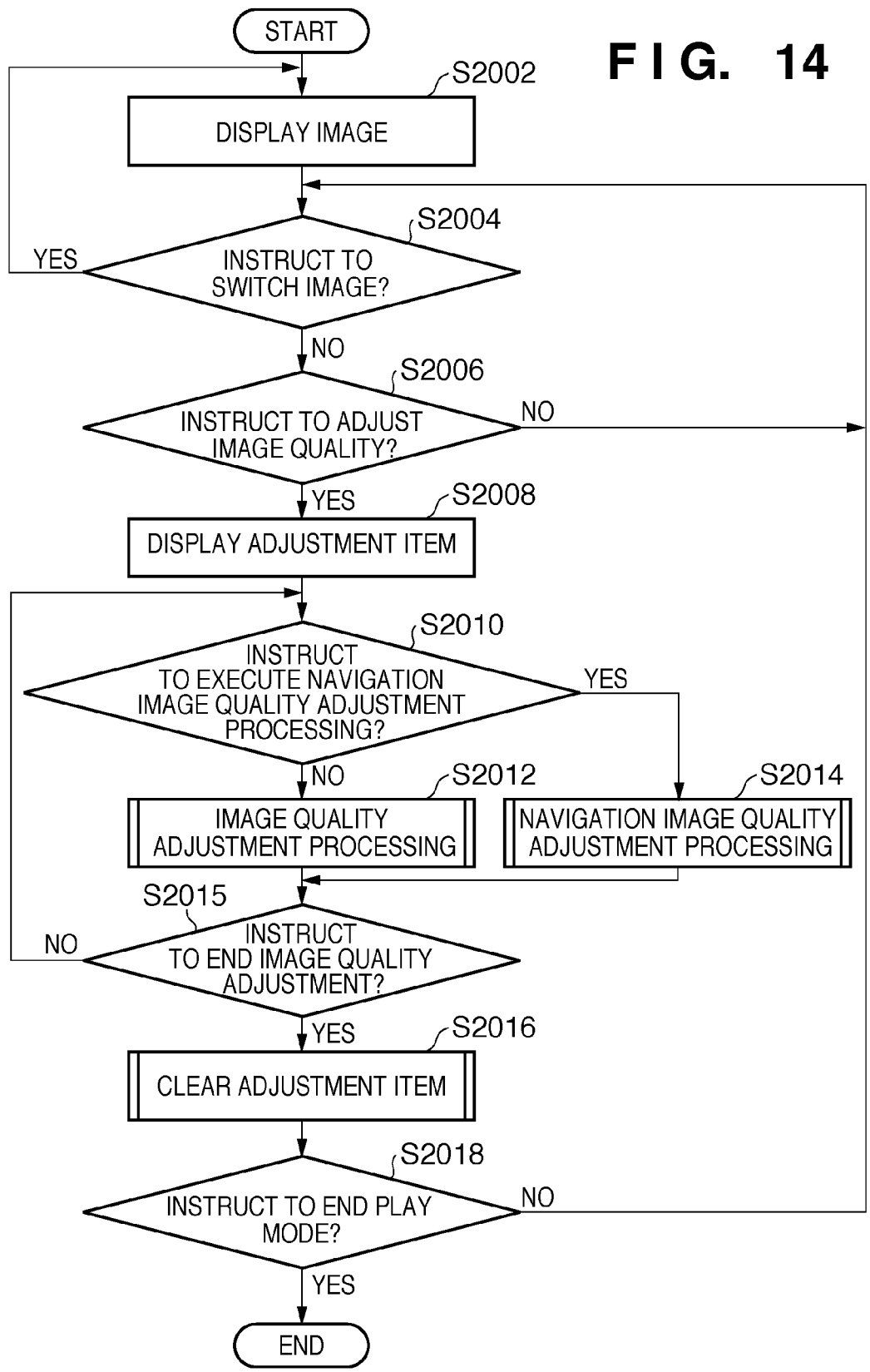
FIG. 14 is a flowchart for explaining image processing in the image processor of the image sensing apparatus shown in FIG. 12.

The operation of image processing (image processing program) in the image processor 300 of the image sensing apparatus 200 will be described below. The image processing in the image processor 300 is executed when the CPU 302 systematically controls the respective units of the image processor 300. In this embodiment, when the user operates the mode dial 210 to set the image sensing apparatus 200 in the play mode, the image processing program is launched. In other words, this embodiment will explain the operation of the image processing (image processing program) in the play mode of the image sensing apparatus 200. Note that FIG. 14 is a flowchart for explaining the image processing in the image processor 300 of the image sensing apparatus 200.

In step S2002, the CPU 302 temporarily transfers one of image data stored in the external recording medium 316A to the internal memory 306, applies image processing to the transferred image data, and displays an image of that image data on the display unit 312 (LCD 208).

The CPU 302 determines in step S2004 whether or not the user instructs to switch the image displayed on the display unit 312, that is, whether or not he or she presses a right or left key of the touch wheel 214 in this embodiment. If the user gives the instruction to switch the image displayed on the display unit 312, the process returns to step S2002 to display the next image. On the other hand, if the user does not give the instruction to switch the image displayed on the display unit 312, the process advances to step S2006.

The CPU 302 determines in step S2006 whether or not the user gives the instruction to adjust the image quality of the image displayed on the display unit 312, that is, whether or not the user presses (selects) the menu button 218 in this embodiment. If the user does not give the instruction to adjust the image quality of the image displayed on the display unit 312, the process returns to step S2004. On the other hand, if the user gives the instruction to adjust the image quality of the image displayed on the display unit 312, the process advances to step S2008.

In step S2008, the CPU 302 displays a plurality of adjustment items 332 on the image (i.e., the display screen) displayed on the display unit 312, as shown in FIG. 15. In this embodiment, exposure compensation, contrast, and saturation are displayed as the plurality of adjustment items 332, but other adjustment items may be displayed. One adjustment item 332a of the plurality of adjustment items 332 is highlighted, and an image quality adjustment controller 334 used to change (adjust) the adjustment value of the highlighted adjustment item 332a is displayed on the image displayed on the display unit 312. In this embodiment, the image quality adjustment controller 334 is displayed as a slider, but may be a radio button, check box, combo box, button, or the like. An adjustment value 334a on the image quality adjustment controller 334 is initially set based on adjustment value information included in image data. When image data does not include any adjustment value information, the adjustment value 334a on the image quality adjustment controller 334 is initially set based on image information. FIG. 15 is a view showing an example of the plurality of adjustment items 332 displayed on the image displayed on the display unit 312 in step S2008.

The CPU 302 determines in step S2010 whether or not the user gives the instruction to execute navigation image quality adjustment processing, that is, whether or not he or she presses (selects) the DISP button 212 in this embodiment. If the user does not give the instruction to execute navigation image quality adjustment processing, the process advances to step S2012 to execute image quality adjustment processing. On the other hand, if the user gives the instruction to execute the navigation image quality adjustment processing, the process advances to step S2014 to execute the navigation image quality adjustment processing. Note that the image quality adjustment processing in step S2012 and the navigation image quality adjustment processing in step S2014 will be described in detail later.

The CPU 302 determines in step S2015 whether or not the user instructs to end adjustment of the image quality of the image displayed on the display unit 312, that is, whether or not he or she presses (selects) the menu button 218. If the user does not give the instruction to end adjustment of the image quality of the image displayed on the display unit 312, the process returns to step S2010. On the other hand, if the user gives the instruction to end adjustment of the image quality of the image displayed on the display unit 312, the process advances to step S2016.

In step S2016, the CPU 302 clears the plurality of adjustment items 332 displayed on the image in step S2008. Note that the image quality adjustment controller 334 used to change (adjust) the adjustment value of the highlighted adjustment item 332a is also cleared upon clearing the plurality of adjustment items 332.

The CPU 302 determines in step S2018 whether or not the user gives the instruction to end the play mode, that is, whether or not he or she switches the mode by operating the mode dial 210 in this embodiment. If the user does not give the instruction to end the play mode, the process returns to step S2004. On the other hand, if the user gives the instruction to end the play mode, the CPU 302 ends the image processing (image processing program).

Figure 16:
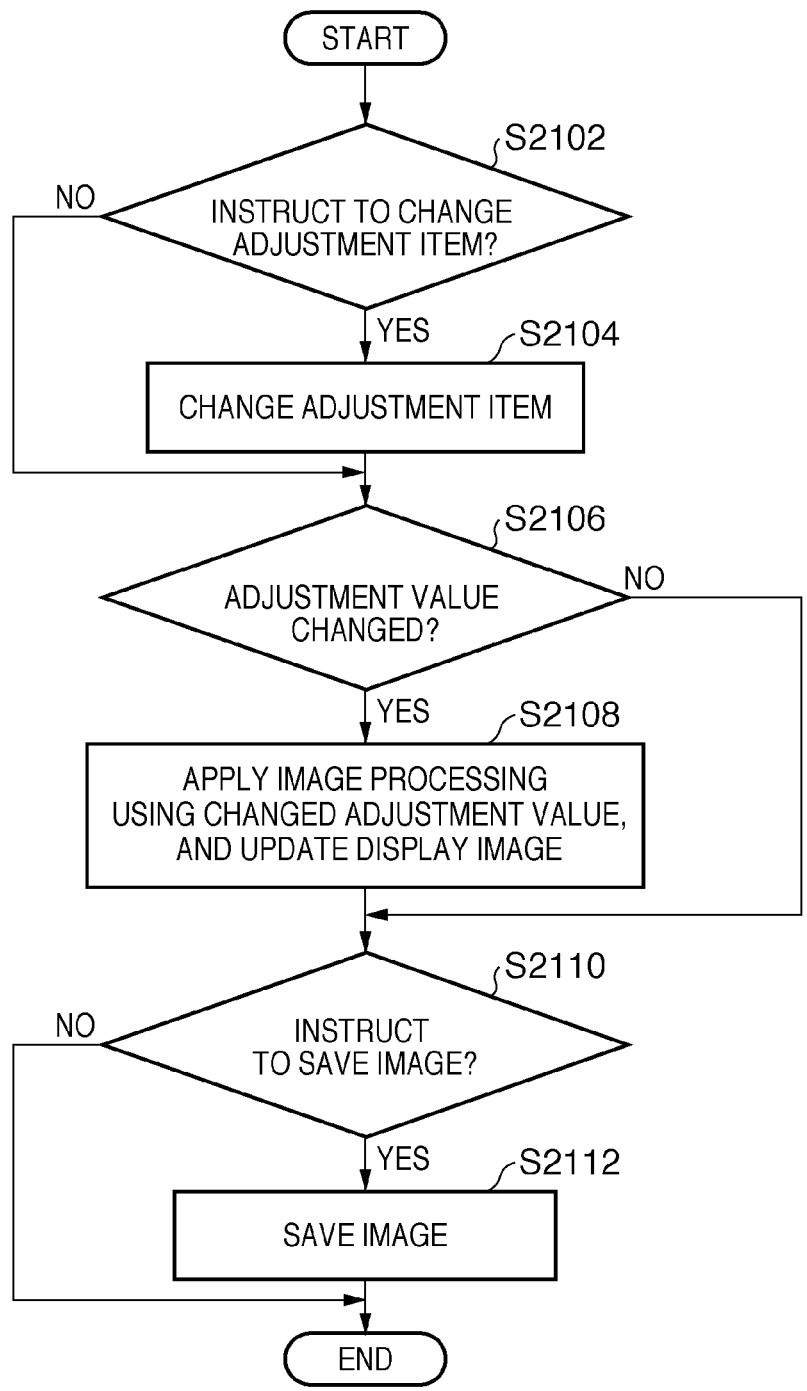
FIG. 16 is a flowchart for explaining image quality adjustment processing in step S2012 in FIG. 14.

The image quality adjustment processing in step S2012 will be described below with reference to FIG. 16.

The CPU 302 determines in step S2102 whether or not the user gives the instruction to change the highlighted adjustment item 332a of the plurality of adjustment items 332 displayed on the image in step S2008, that is, whether or not he or she presses an up or down key of the touch wheel 214 in this embodiment. If the user does not give the instruction to change the highlighted adjustment item 332a, the process jumps to step S2106. On the other hand, if the user gives the instruction to change the highlighted adjustment item 332a, the process advances to step S2104.

Figure 17:
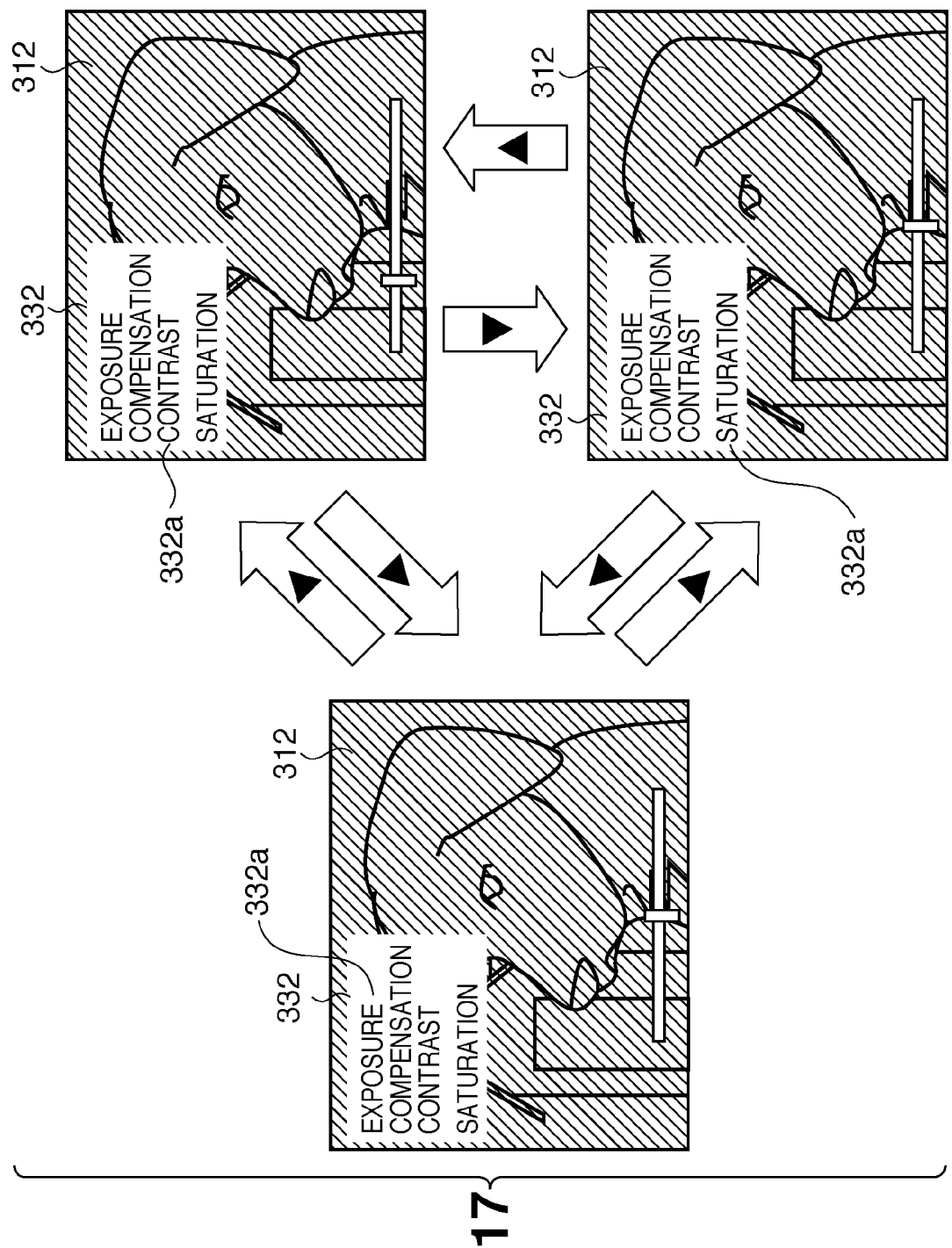
FIG. 17 is a view for explaining changes of a highlighted adjustment item in step S2104 in FIG. 16.

In step S2104, the CPU 302 switches the highlighted adjustment item 332a in accordance with the instruction in step S2102. In this embodiment, every time the user presses the down key of the touch wheel 214, the highlighted adjustment item 332a is changed in the order of exposure compensation, contrast, saturation, and exposure compensation, as shown in FIG. 17. On the other hand, every time the user presses the up key of the touch wheel 214, the highlighted adjustment item 332a is changed in the order of exposure compensation, saturation, contrast, and exposure compensation. FIG. 17 is a view for explaining changes of the highlighted adjustment item 332a in step S2104.

The CPU 302 determines in step S2106 whether or not the user changes the adjustment value 334a on the image quality adjustment controller 334 of the highlighted adjustment item 332a, that is, whether or not he or she presses the right or left key of the touch wheel 214 in this embodiment. If the user does not change the adjustment value 334a on the image quality adjustment controller 334 of the highlighted adjustment item 332a, the process jumps to step S2110. On the other hand, if the user changes the adjustment value 334a on the image quality adjustment controller 334 of the highlighted adjustment item 332a, the process advances to step S2108.

In step S2108, the CPU 302 loads the RAW image data as a processing target, the image quality of which is to be adjusted, applies image processing using the adjustment value changed in step S2106 to the image data, and updates the image displayed on the display unit 312. The image processing will be practically explained below taking, as an example, a case in which the adjustment value of exposure compensation is changeable within the range from −2 to +2, and can be set (changed) in increments/decrements of 0.1 within this range. The RGB values of RAW image data are converted into luminance values first. When the adjustment value of exposure compensation is changed, exposure compensation processing is applied to the luminance values of the RAW image data using the changed adjustment value. The exposure compensation processing result is inversely converted into RGB values to update image information. Note that this embodiment has explained the image processing using luminance values. However, the image processing may be implemented by other methods.

The CPU 302 determines in step S2110 whether or not the user gives the instruction to save the image displayed on the display unit 312, that is, whether or not he or she presses (selects) the set button 216 in this embodiment. If the user does not give the instruction to save the image displayed on the display unit 312, the CPU 302 ends the image quality adjustment processing in step S2012. On the other hand, if the user gives the instruction to save the image displayed on the display unit 312, the process advances to step S2112.

In step S2112, the CPU 302 saves the image displayed on the display unit 312, thus ending the image quality adjustment processing. More specifically, the CPU 302 applies image processing such as compression processing according to the save format selected by the user, and saves the processed image data in the external recording medium 316A.

The navigation image quality adjustment processing in step S2014 will be described below with reference to FIGS. 18A and 18B.

Figure 19:
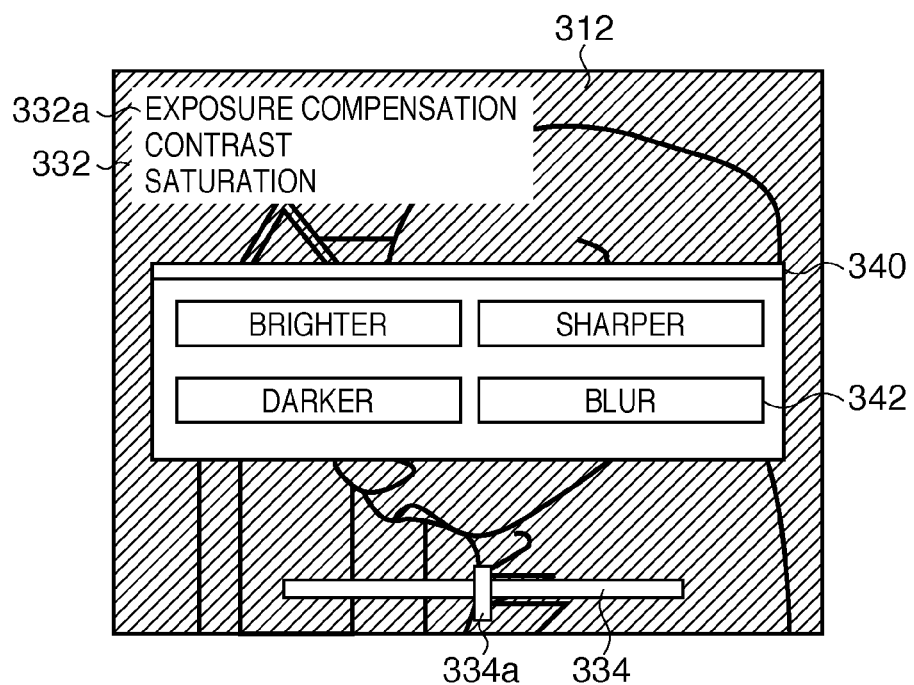
FIG. 19 is a view showing an example of a navigation window displayed on the display unit in step S2202 in FIG. 18A.

In step S2202, the CPU 302 displays a navigation window 340 on the image (i.e., the display screen) displayed on the display unit 312, as shown in FIG. 19. The navigation window 340 includes a plurality of image quality adjustment goal buttons 342 for respective image quality adjustment goals of an image. This embodiment sets four image quality adjustment goals "brighter", "darker", "sharper", and "blur". However, other image quality adjustment goals may be set. FIG. 19 is a view showing an example of the navigation window 340 displayed on the display unit 312 in step S2202.

The CPU 302 determines in step S2204 whether or not the user selects one of the image quality adjustment goal buttons 342 on the navigation window 340. If no image quality adjustment goal button 342 on the navigation window 340 is selected, the CPU 302 waits until the user selects one of the image quality adjustment goal buttons 342. On the other hand, if one of the image quality adjustment goal buttons 342 on the navigation window 340 is selected, the process advances to step S2206.

In step S2206, the CPU 302 calculates adjustment values (target values) of the adjustment items according to the image quality adjustment goal button 342 selected in step S2204. This embodiment will explain a case in which the user selects the image quality adjustment goal button 342 "brighter", and the CPU 302 calculates four target values to realize the image quality adjustment goal. An image becomes brighter by changing (adjusting) the adjustment values of exposure compensation and color density in a plus direction. For example, assuming that the current adjustment values of exposure compensation and color density are 0, and the maximum value is +2.0, the CPU 302 calculates adjustment values by equally dividing the interval between 0 and +2.0 into four as four target values, as indicated by the following first, second, third, and fourth target values.

First target value "adjustment value of exposure compensation: +0.5, adjustment value of color density: +0.5"

Second target value "adjustment value of exposure compensation: +1.0, adjustment value of color density: +1.0"

Third target value "adjustment value of exposure compensation: +1.5, adjustment value of color density: +1.5"

Fourth target value "adjustment value of exposure compensation: +2.0, adjustment value of color density: +2.0"

In this embodiment, the target values are calculated by equally dividing the interval between the current adjustment value and its maximum or minimum value. Alternatively, for example, image information such as image sensing information may be acquired, and appropriate adjustment values may be automatically calculated as target values. Also, the number of target values calculated in step S2206 is not limited to four.

Figure 20:
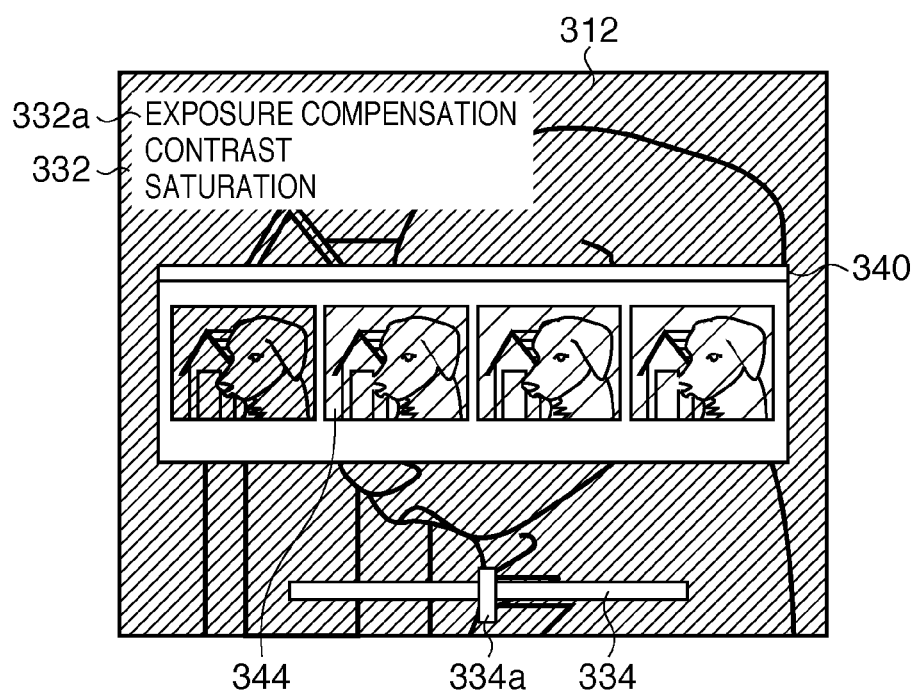
FIG. 20 is a view showing an example of the navigation window displayed on the display unit in step S2208 in FIG. 18A.

In step S2208, the CPU 302 generates and displays thumbnail images by applying image processing using the adjustment values (target values) of the adjustment items calculated in step S2206 to image data of the image displayed on the display unit 312. More specifically, as shown in FIG. 20, the CPU 302 displays thumbnail images on a thumbnail display area 344 on the navigation window 340. In FIG. 20, thumbnail images are generated in correspondence with the four target values (first, second, third, and fourth target values), and are displayed on the thumbnail display area 344. FIG. 20 is a view showing an example of the navigation window 340 displayed on the display unit 312 in step S2208.

The CPU 302 determines in step S2210 whether or not the user selects one of the plurality of thumbnail images displayed on the thumbnail display area 344 on the navigation window 340 in step S2208. For example, the user selects one of the plurality of thumbnail images by pressing the set button 216 while switching the thumbnail images by operating the touch wheel 214. If the user does not select any thumbnail image, the CPU 302 waits until he or she selects a thumbnail image. If the user selects one thumbnail image, the process advances to step S2212.

In step S2212, the CPU 302 closes the navigation window 340.

Figure 21:
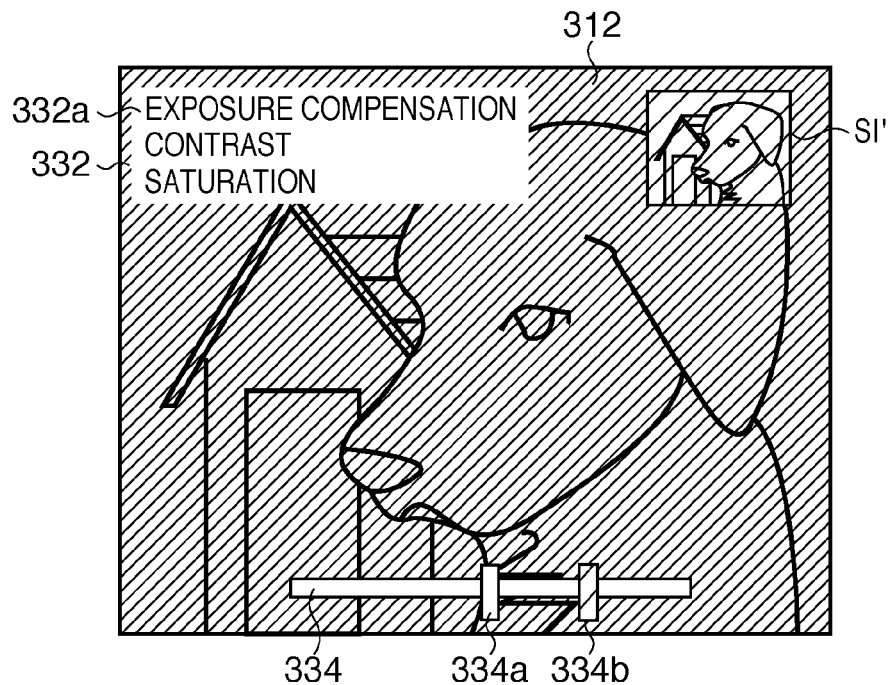
FIG. 21 is a view showing an example of a thumbnail image and an image quality adjustment controller (the current adjustment value and adjustment value (target value) of the thumbnail image) displayed on the display unit in steps S2214 and S2216 in FIG. 18A.

In step S2214, the CPU 302 displays a thumbnail image SI' selected in step S2210 on the image (i.e., the display screen) displayed on the display unit 312, as shown in FIG. 21. FIG. 21 is a view showing an example of the thumbnail image SI' and the image quality adjustment controller 334 (the current adjustment value 334a and an adjustment value (target value) 334b of the thumbnail image SI'), which are displayed on the display unit 312 in step S2214 and step S2216 (to be described below).

In step S2216, the CPU 302 displays explicitly the adjustment value (target value) 334b of the selected thumbnail image SI' to be discriminated from the current adjustment value 334a on the image quality adjustment controller 334, as shown in FIG. 21. In this embodiment, the adjustment value (target value) 334b is displayed (explicitly expressed) using a mark. However, for example, the adjustment value (target value) 334b may be flickered or displayed (explicitly expressed) translucently.

Figure 22:
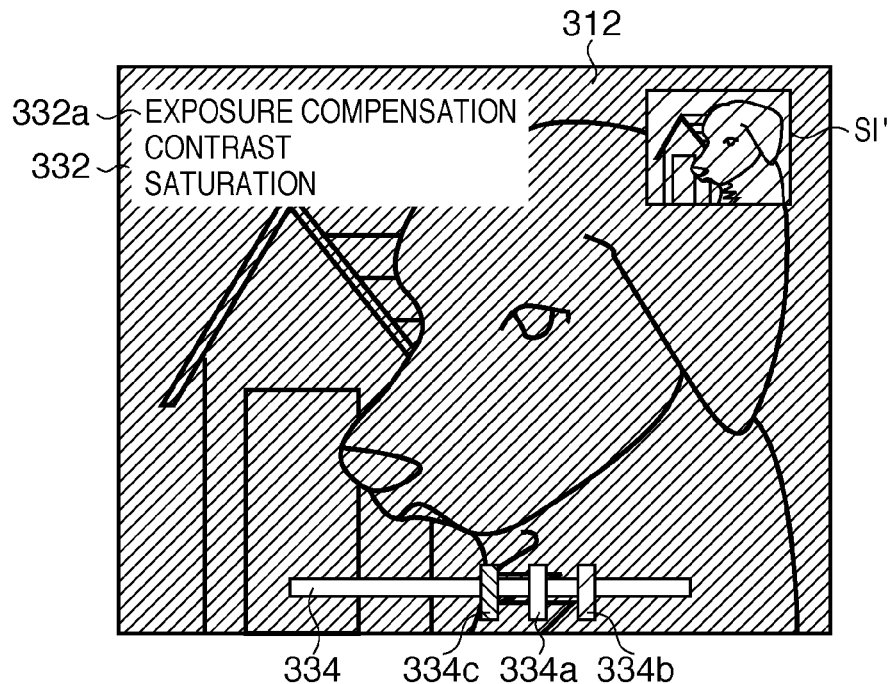
FIG. 22 is a view showing the image quality adjustment controller (the current adjustment value, adjustment value (target value) of the thumbnail image, and adjustment value before change) displayed on the display unit in step S2218 in FIG. 18A.

In step S2218, in the image quality adjustment controller 334, the CPU 302 displays (explicitly expresses) an adjustment value 334c before change so as to be discriminated from the current adjustment value 334a and the adjustment value (target value) 334b of the thumbnail image SI', as shown in FIG. 22. More specifically, the CPU 302 displays the adjustment value 334c before change to have a color different from those of the current adjustment value 334a and the adjustment value (target value) 334b of the thumbnail image SI'. As a result, the user can change (adjust) the adjustment value of the adjustment item while comparing it with the adjustment value 334c before change and the current adjustment value 334a. Also, the user can revert the adjustment value of the adjustment item to the adjustment value 334c before change without memorizing and recording the adjustment value 334c before change. Note that FIG. 22 is a view showing an example of the image quality adjustment controller 334 (the current adjustment value 334a, adjustment value (target value) 334b of the thumbnail image SI', and adjustment value 334c before change) displayed on the display unit 312 in step S2218. Note that FIG. 22 shows an example in which the current adjustment value 334a is changed based on the adjustment value (target value) 334b of the thumbnail image SI' and adjustment value 334c before change. However, it should be noted that the current adjustment value 334a and the adjustment value 334c before change overlap each other (see FIG. 21) at the timing of step S2218.

The CPU 302 determines in step S2220 whether or not the user gives the instruction to change the highlighted adjustment item 332a of the plurality of adjustment items 332 displayed on the image, that is, whether or not he or she presses the up or down key of the touch wheel 214 in this embodiment. If the user does not give the instruction to change the highlighted adjustment item 332a, the process jumps to step S2224. On the other hand, if the user gives the instruction to change the highlighted adjustment item 332a, the process advances to step S2222.

In step S2222, the CPU 302 changes the highlighted adjustment item 332a in accordance with the instruction in step S2220.

The CPU 302 determines in step S2224 whether or not the user changes the adjustment value 334a on the image quality adjustment controller 334 of the highlighted adjustment item 332a, that is, whether or not he or she presses the right or left key of the touch wheel 214 in this embodiment. If the user does not give the instruction to change the adjustment value 334a on the image quality adjustment controller 334 of the highlighted adjustment item 332a, the process jumps to step S2228. On the other hand, if the user changes the adjustment value 334a on the image quality adjustment controller 334 of the highlighted adjustment item 332a, the process advances to step S2226.

In step S2226, the CPU 302 loads the RAW image data as a processing target, the image quality of which is to be adjusted, applies image processing using the adjustment value changed in step S2224 to the image data, and updates the image displayed on the display unit 312.

The CPU 302 determines in step S2228 whether or not the user gives the instruction to execute automatic adjustment of the adjustment value of the adjustment item, that is, whether or not he or she presses (selects) the jump button 220 in this embodiment. If the user does not give the instruction to execute the automatic adjustment of the adjustment value of the adjustment item, the process jumps to step S2232. On the other hand, if the user gives the instruction to execute the automatic adjustment of the adjustment value of the adjustment item, the process advances to step S2230.

In step S2230, the CPU 302 automatically adjusts the adjustment value of the adjustment item. More specifically, the CPU 302 changes (adjusts) the current adjustment value to the adjustment value of the thumbnail image selected in step S2210 (i.e., the adjustment value (target value) of the adjustment item calculated in step S2206).

The CPU 302 determines in step S2232 whether or not the current adjustment value is equal to the target value. If the current adjustment value is not equal to the target value, the process jumps to step S2236. On the other hand, if the current adjustment value is equal to the target value, the process advances to step S2234.

In step S2234, the CPU 302 notifies the user that the current adjustment value is equal to the target value by, for example, flickering the adjustment value (target value) 334b of the thumbnail image SI' on the image quality adjustment controller 334. As a result, the user can recognize that the current adjustment value is the one with which the same image quality as that of the thumbnail image that has undergone the image processing using that adjustment value is obtained.

The CPU 302 determines in step S2236 whether or not the user gives the instruction to save the image displayed on the display unit 312, that is, whether or not he or she presses (selects) the set button 216 in this embodiment. If the user does not give the instruction to save the image displayed on the display unit 312, the process jumps to step S2240. On the other hand, if the user gives the instruction to save the image displayed on the display unit 312, the process advances to step S2238.

In step S2238, the CPU 302 saves the image displayed on the display unit 312. More specifically, the CPU 302 applies image processing such as compression processing according to the save format selected by the user, and saves the processed image data in the external recording medium 316A.

The CPU 302 determines in step S2240 whether or not the user gives the instruction to end the navigation image quality adjustment processing, that is, whether or not he or she presses (selects) the DISP button 212 in this embodiment. If the user does not give the instruction to end the navigation image quality adjustment processing, the process returns to step S2220. On the other hand, if the user gives the instruction to end the navigation image quality adjustment processing, the process advances to step S2242.

In step S2242, the CPU 302 clears the plurality of adjustment items 332 displayed on the image, and ends the navigation image quality adjustment processing. Note that the image quality adjustment controller 334 used to change (adjust) the adjustment value of the highlighted adjustment item 332a is also cleared upon clearing the plurality of adjustment items 332.

As described above, according to the second embodiment, the user is navigated through the path of the adjustment item to be adjusted and processing associated with a change of the adjustment value of that adjustment item according to the image quality adjustment goal of an image, and the image quality can be adjusted while relatively comparing the current adjustment value, target value, and adjustment value before change. Therefore, even a user inexperienced in adjustment of the image quality of an image can easily and efficiently accomplish it.

In the image quality adjustment processing in step S2012 or the navigation image quality adjustment processing in step S2014, if the user interrupts the image quality adjustment processing or turns off the power switch of the image sensing apparatus 200, the adjustment value immediately before that operation may be recorded. Upon restarting the image quality adjustment processing, the adjustment value immediately before that operation may be reflected.

In this embodiment, the image sensing apparatus 200 has been explained as a digital camera used to sense a still image. However, the present invention can also be applied to electronic cameras such as a digital camera that can also sense a moving image, and a digital video camera that senses a moving image.

Third Embodiment

This embodiment will explain the operation of image processing (image processing program) in an image sensing mode of the image sensing apparatus 200.

Note that the image processing program of this embodiment recorded in the storage unit 304 makes the respective components of the image processor 300 serve as an image display unit, image quality adjustment unit, input unit, calculation unit, and control unit. The image display unit displays an image on a display screen. The image quality adjustment unit adjusts the image quality of an image displayed on the display screen by the image display unit based on adjustment values of a plurality of adjustment items. The input unit allows the user to input an adjustment goal of the image quality of the image displayed on the display screen. The calculation unit calculates a target value as a target of each of the adjustment values of the plurality of adjustment items based on the adjustment goal input using the input unit. The control unit controls the image display unit to display the current adjustment value and target value on the display screen so as to discriminate the current adjustment value of the image displayed on the display screen from the target value calculated by the calculation unit.

The image processing program of this embodiment recorded in the storage unit 304 makes the respective components of the image processor 300 serve as a change unit, generation unit, display unit, selection unit, acquisition unit, and notification unit. The change unit changes each of the adjustment values of the plurality of adjustment items. The generation unit generates a plurality of thumbnail images by applying image processing using a plurality of target values calculated by the calculation unit to the image displayed on the display screen. The display unit displays the plurality of thumbnail images generated by the generation unit on the display screen. The selection unit prompts the user to select the plurality of thumbnail images displayed by the display unit. The acquisition unit acquires each of the adjustment values of the plurality of adjustment items of the thumbnail image selected by the selection unit. The notification unit notifies the user when the change unit changes each of the adjustment values of the plurality of adjustment items of the image displayed on the display screen to the target value.

Furthermore, the image processing program of this embodiment recorded in the storage unit 304 makes the respective components of the image processor 300 serve as an acquisition unit, selection unit, and save unit. The acquisition unit acquires an adjustment value before change and that after change for each of the plurality of adjustment items of the image displayed on the display screen. The selection unit prompts the user to select one or both of images based on the adjustment values before and after change acquired by the acquisition unit. The save unit saves the image selected by the selection unit in association with the adjustment value acquired by the acquisition unit or saves the image by applying image processing using the adjustment value acquired by the acquisition unit.

Figure 23A:
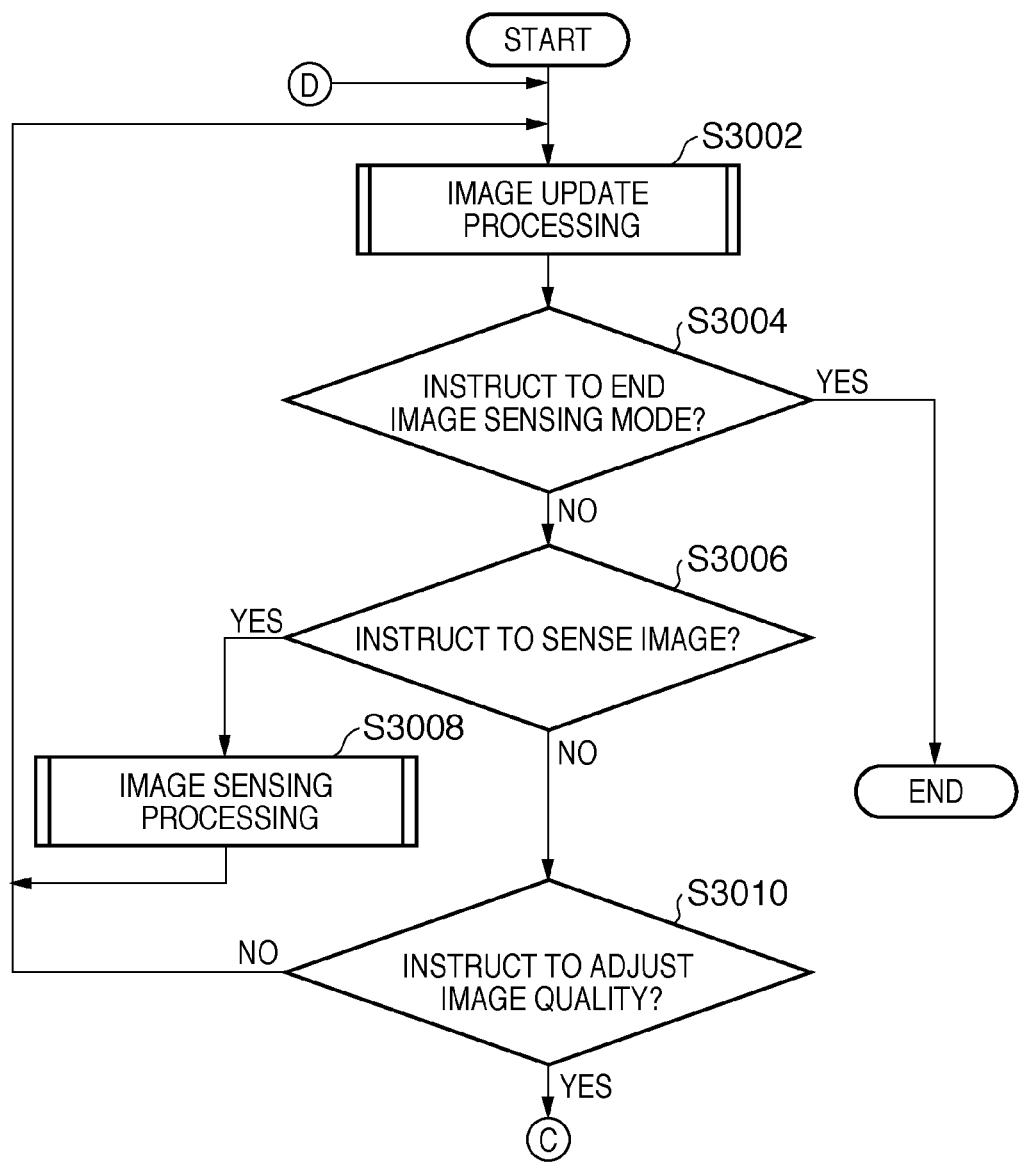
FIGS. 23A and 23B are flowcharts for explaining image processing in the image processor of the image sensing apparatus shown in FIG. 12.
Figure 23B:
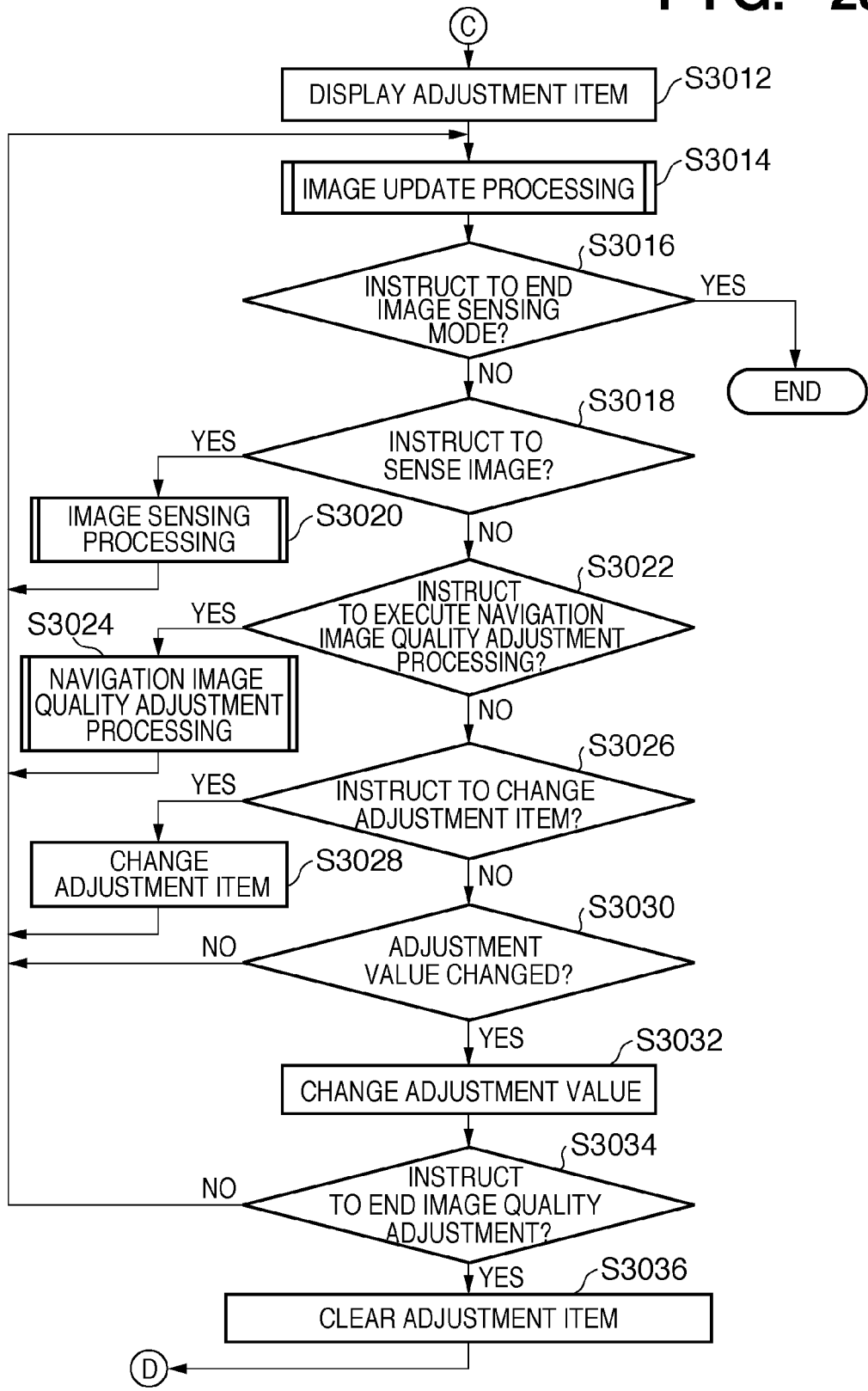

The image processing in the image sensing mode of the image sensing apparatus 200 is executed when the CPU 302 systematically controls the respective units of the image processor 300. FIGS. 23A and 23B are flowcharts for explaining the image processing in the image processor 300 of the image sensing apparatus 200.

In step S3002, the CPU 302 reads an electrical signal from the CCD 308, and executes image update processing of an image to be displayed on the display unit 312. Note that the image update processing in step S3002 will be described in detail later.

The CPU 302 determines in step S3004 whether or not the user gives the instruction to end the image sensing mode, that is, whether or not he or she presses the power button 204 or switches the mode by operating the mode dial 210 in this embodiment. If the user gives the instruction to end the image sensing mode, the CPU 302 ends the operation of the image processing (image processing program). On the other hand, if the user does not give the instruction to end the image sensing mode, the process advances to step S3006.

The CPU 302 determines in step S3006 whether or not the user gives the instruction to sense an image of an object, that is, whether or not he or she presses the shutter button 206 in this embodiment. If the user gives the instruction to sense an image of an object, the process advances to step S3008. On the other hand, if the user does not give the instruction to sense an image of an object, the process advances to step S3010.

In step S3008, the CPU 302 executes image sensing processing for sensing an image of an object. Note that the image sensing processing in step S3008 will be described in detail later.

The CPU 302 determines in step S3010 whether or not the user gives the instruction to adjust the image quality of the image displayed on the display unit 312, that is, whether or not he or she presses (selects) the menu button 218 in this embodiment. If the user does not give the instruction to adjust the image quality of the image displayed on the display unit 312, the process returns to step S3002. On the other hand, if the user gives the instruction to adjust the image quality of the image displayed on the display unit 312, the process advances to step S3012.

In step S3012, the CPU 302 displays a plurality of adjustment items 332 on the image (i.e., the display screen) displayed on the display unit 312, as shown in FIG. 15.

In step S3014, the CPU 302 reads an electrical signal from the CCD 308, and executes image update processing of an image to be displayed on the display unit 312 as in step S3002. Note that the image update processing in step S3014 will be described in detail later.

The CPU 302 determines in step S3016 whether or not the user gives the instruction to end the image sensing mode. If the user gives the instruction to end the image sensing mode, the CPU 302 ends the operation of the image processing (image processing program). On the other hand, if the user does not give the instruction to end the image sensing mode, the process advances to step S3018.

The CPU 302 determines in step S3018 whether or not the user gives the instruction to sense an image of an object. If the user gives the instruction to sense an image of an object, the process advances to step S3020. On the other hand, if the user does not give the instruction to sense an image of an object, the process advances to step S3022.

In step S3020, the CPU 302 executes image sensing processing for sensing an image of an object. Note that the image sensing processing in step S3020 will be described in detail later.

The CPU 302 determines in step S3022 whether or not the user gives the instruction to execute navigation image quality adjustment processing, that is, whether or not he or she presses (selects) the DISP button 212 in this embodiment. If the user gives the instruction to execute navigation image quality adjustment processing, the process advances to step S3024 to execute the navigation image quality adjustment processing. On the other hand, if the user does not give the instruction to execute the navigation image quality adjustment processing, the process advances to step S3026. Note that the navigation image quality adjustment processing in step S3024 will be described in detail later.

The CPU 302 determines in step S3026 whether or not the user gives the instruction to change a highlighted adjustment item 332a of the plurality of adjustment items 332 displayed on the image, that is, whether or not he or she presses an up or down key of the touch wheel 214 in this embodiment. If the user gives the instruction change the highlighted adjustment item 332a, the process advances to step S3028. On the other hand, if the user does not give the instruction to change the highlighted adjustment item 332a, the process advances to step S3030.

In step S3028, the CPU 302 switches the highlighted adjustment item 332a in accordance with the instruction in step S3026.

The CPU 302 determines in step S3030 whether or not the user changes the adjustment value 334a on the image quality adjustment controller 334 of the highlighted adjustment item 332a, that is, whether or not he or she presses a right or left key of the touch wheel 214 in this embodiment. If the user does not change the adjustment value 334a on the image quality adjustment controller 334 of the highlighted adjustment item 332a, the process returns to step S3014. On the other hand, if the user changes the adjustment value 334a on the image quality adjustment controller 334 of the highlighted adjustment item 332a, the process advances to step S3032.

In step S3032, the CPU 302 changes the adjustment value 334a of the highlighted adjustment item 332a in accordance with the instruction in step S3030.

The CPU 302 determines in step S3034 whether or not the user gives the instruction to end the adjustment of the image quality of the image displayed on the display unit 312, that is, whether or not he or she presses (selects) the menu button 218. If the user does not give the instruction to end the adjustment of the image quality of the image displayed on the display unit 312, the process returns to step S3014. On the other hand, if the user gives the instruction to end the adjustment of the image quality of the image displayed on the display unit 312, the process advances to step S3036.

In step S3036, the CPU 302 clears the plurality of adjustment items 332 displayed on the image in step S3012, thus ending the operation of the image processing (image processing program). Note that the image quality adjustment controller 334 used to change (adjust) the adjustment value of the highlighted adjustment item 332a is also cleared upon clearing the plurality of adjustment items 332.

The image update processing in steps S3002 and S3014 will be described below with reference to FIG. 24.

In step S3102, the CPU 302 loads image data. More specifically, an electrical signal read from the CCD 308 is converted into image data by the signal processor 310, and the image data is transferred to the CPU 302.

In step S3104, the CPU 302 acquires a current adjustment value for each of the plurality of adjustment items required to adjust the image quality of the image.

In step S3106, the CPU 302 applies image processing using the adjustment value acquired in step S3104 to the image data loaded in step S3102. For example, the image processing will be practically explained below taking, as an example, a case in which the adjustment value of exposure compensation is changeable within the range from −2 to +2, and can be set (changed) in increments/decrements of 0.1 within this range. The RGB values of RAW image data are converted into luminance values first. When the adjustment value of exposure compensation is changed, exposure compensation processing is applied to the luminance values of the RAW image data using the changed adjustment value. The exposure compensation processing result is inversely converted into RGB values to update image information. Note that this embodiment has explained the image processing using luminance values. However, the image processing may be implemented by other methods. In this embodiment, the image processing includes expansion and reduction of image data required to display an image on the display unit 312.

In step S3108, the CPU 302 displays an image of the image data that has undergone the image processing in step S3106 on the display unit 312.

The image sensing processing in steps S3008 and S3020 will be described below with reference to FIG. 25.

In step S3202, the CPU 302 loads image data. More specifically, an electrical signal read from the CCD 308 is converted into image data by the signal processor 310, and the image data is transferred to the CPU 302.

The CPU 302 determines in step S3204 whether or not the current adjustment value is equal to an adjustment value before the image quality adjustment processing for each of the plurality of adjustment items required to adjust the image quality of the image. If the current adjustment value is equal to the adjustment value before the image quality adjustment processing, the process jumps to step S3210. On the other hand, if the current adjustment value is not equal to the adjustment value before the image quality adjustment processing, the process advances to step S3206.

In step S3206, the CPU 302 generates a thumbnail image $SI_A$ that has undergone the image processing using the current adjustment value and a thumbnail image $SI_B$ that has undergone the image processing using the adjustment value before the image quality adjustment processing, and displays these thumbnail images on the display unit 312, as shown in FIG.

26. FIG. 26 is a view showing an example of the thumbnail images $SI_A$ and $SI_B$ displayed on the display unit 312 in step S3206.

The CPU 302 determines in step S3208 if the user gives the instruction for an image to be saved of the thumbnail images $SI_A$ and $SI_B$ displayed on the display unit 312 in step S3206. In this embodiment, the CPU 302 determines whether or not the user presses an "after adjustment" save button 362, "before adjustment" save button 364, or "both" save button 366. The "after adjustment" save button 362 is pressed to give the instruction to save the image that has undergone the image processing using the current adjustment value (thumbnail image $SI_A$). The "before adjustment" save button 364 is pressed to give the instruction to save the image that has undergone the image processing using the adjustment value before the image quality adjustment processing (thumbnail image $SI_B$). The "both" save button 366 is pressed to give the instruction to save both the images that have undergone the image processing using the current adjustment value and the image processing using the adjustment value before the image quality adjustment processing. If the user does not give the instruction for an image to be saved, the CPU 302 waits until the user gives the instruction for an image to be saved. On the other hand, if the user gives the instruction for an image to be saved, the process advances to step S3210.

In step S3210, the CPU 302 saves the image according to the instruction in step S3208. More specifically, the CPU 302 acquires the adjustment values of the adjustment items of the image to be saved, appends adjustment value information to image data as a processing target (i.e., to associate the image with the adjustment values), and saves the image in the external recording medium 316A. If the image data as the processing target is not RAW image data, the CPU 302 may apply image processing to the image data as the processing target using the acquired adjustment values, and may save that image data in the external recording medium 316A.

The navigation image quality adjustment processing in step S3024 will be described below with reference to FIGS. 27A to 27D.

In step S3302, the CPU 302 displays a navigation window 340 on the image (i.e., the display screen) displayed on the display unit 312, as shown in FIG. 19. This embodiment sets four image quality adjustment goals "brighter", "darker", "sharper", and "blur". However, other image quality adjustment goals may be set.

Figure 24:
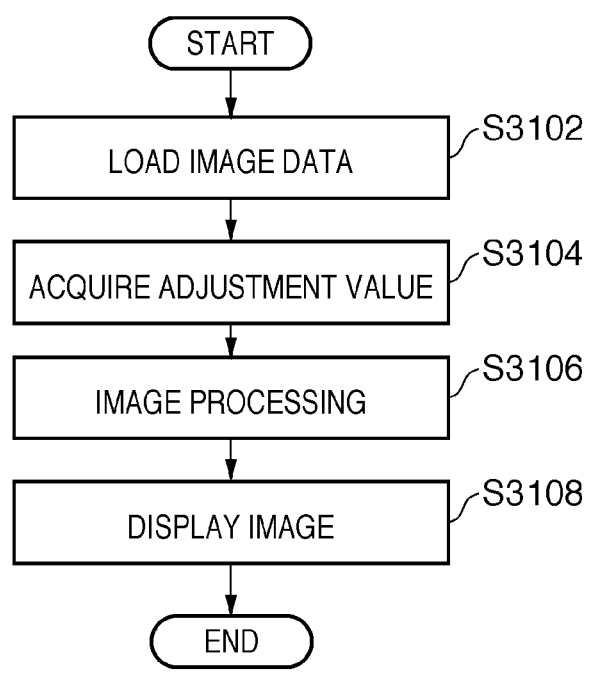
FIG. 24 is a flowchart for explaining image update processing in steps S3002 and S3014 in FIGS. 23A and 23B.
Figure 27A:
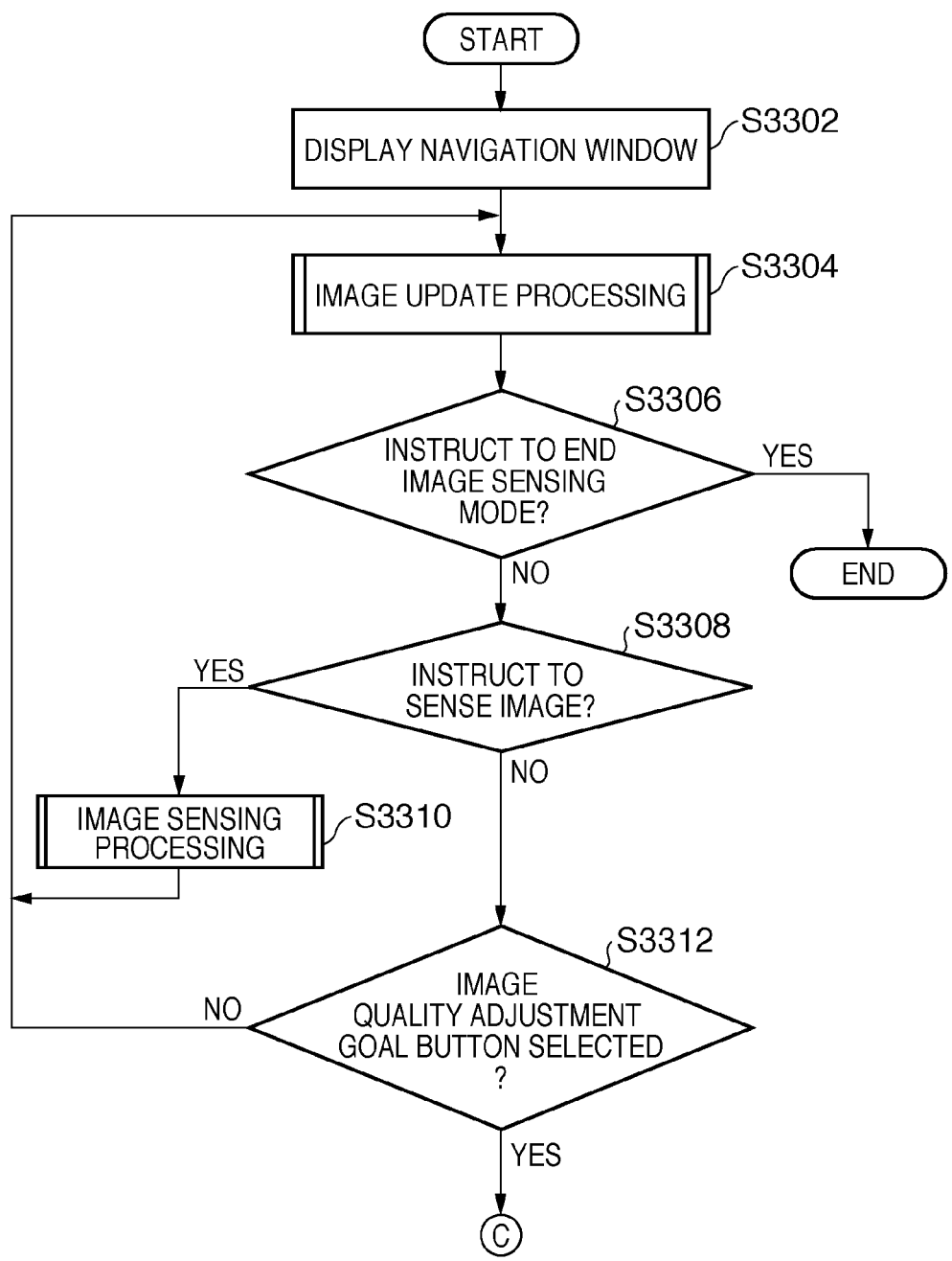
Figure 27C:
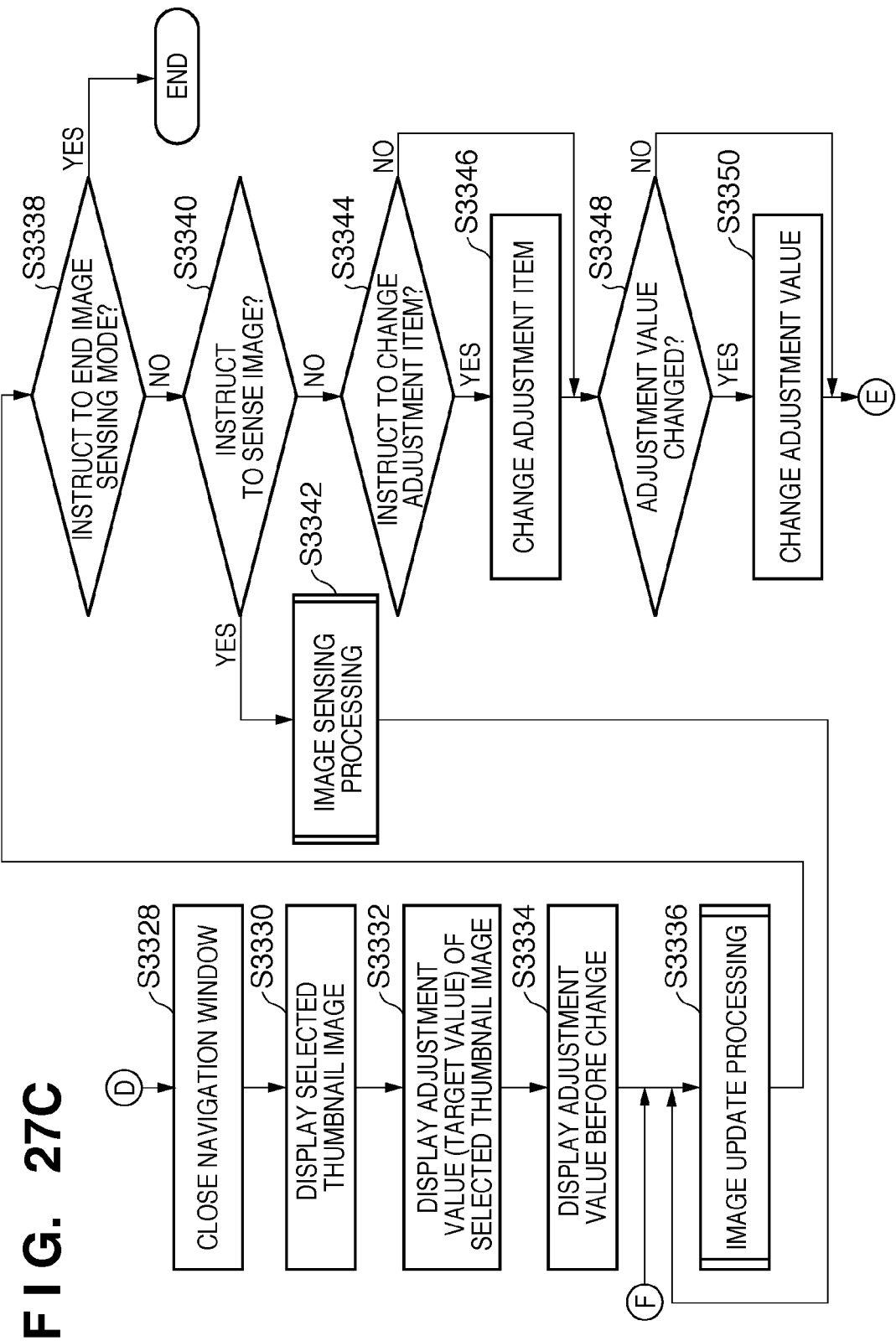
Figure 27D:
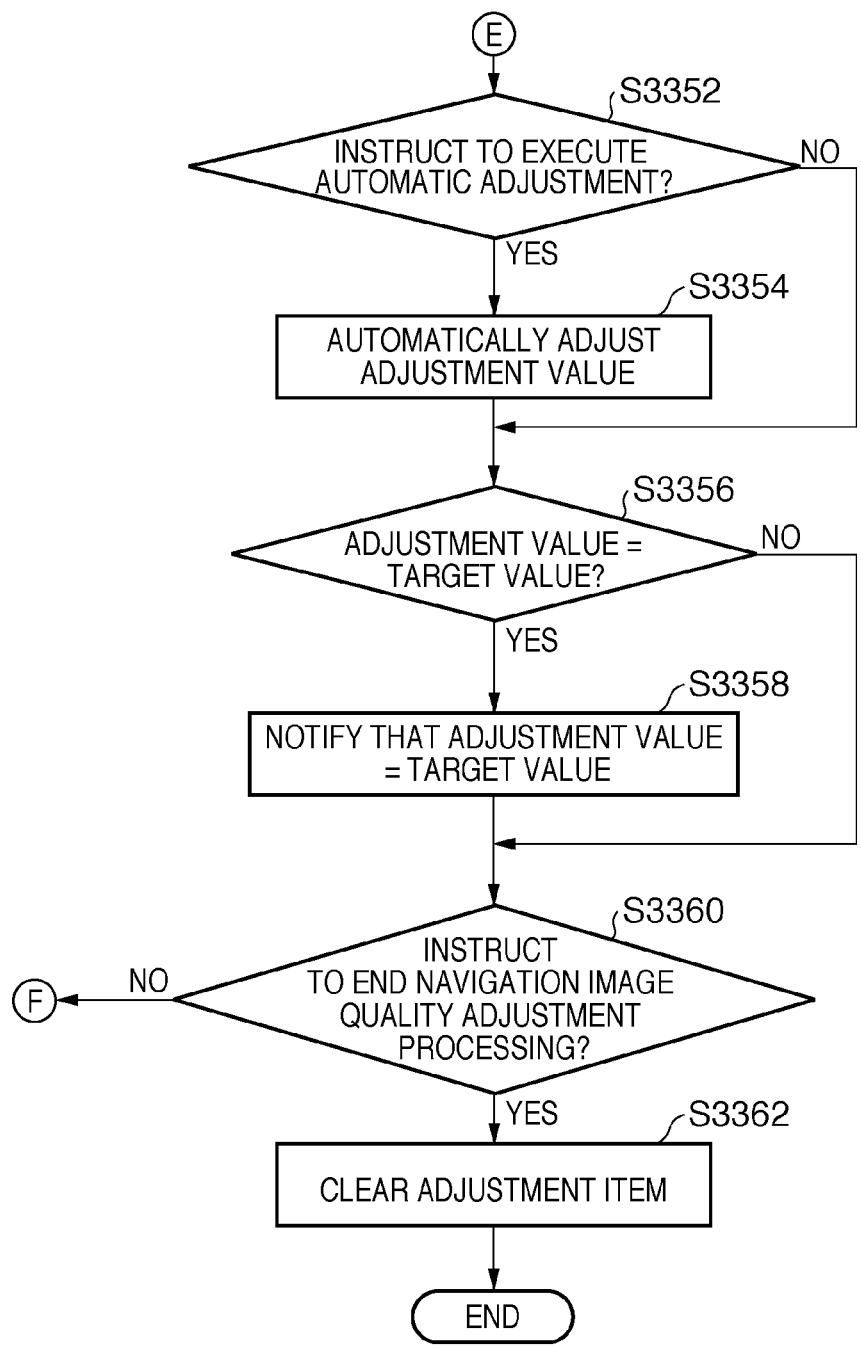

In step S3304, the CPU 302 reads an electrical signal from the CCD 308, and executes the image update processing of an image to be displayed on the display unit 312 as in steps S3002 and S3014 (see FIG. 24).

The CPU 302 determines in step S3306 whether or not the user gives the instruction to end the image sensing mode. If the user gives the instruction to end the image sensing mode, the CPU 302 ends the operation of the image processing (image processing program). On the other hand, if the user does not give the instruction to end the image sensing mode, the process advances to step S3308.

The CPU 302 determines in step S3308 whether or not the user gives the instruction to sense an image of an object. If the user gives the instruction to sense an image of an object, the process advances to step S3310. On the other hand, if the user does not give the instruction to sense an image of an object, the process advances to step S3312.

In step S3310, the CPU 302 executes the image sensing processing for sensing an image of an object as in steps S3008 and S3020 (see FIG. 25).

The CPU 302 determines in step S3312 whether or not the user selects one of image quality adjustment goal buttons 342 on the navigation window 340. If no image quality adjustment goal button 342 on the navigation window 340 is selected, the process returns to step S3304. On the other hand, if one of the image quality adjustment goal buttons 342 on the navigation window 340 is selected, the process advances to step S3314.

In step S3314, the CPU 302 calculates adjustment values (target values) of the adjustment items according to the image quality adjustment goal button 342 selected in step S3312. This embodiment will explain a case in which the user selects the image quality adjustment goal button 342 "brighter", and the CPU 302 calculates four target values to realize the image quality adjustment goal. An image can become brighter by changing (adjusting) the adjustment values of exposure compensation and color density in a plus direction. For example, assuming that the current adjustment values of exposure compensation and color density are 0, and the maximum value is +2.0, the CPU 302 calculates adjustment values by equally dividing the interval between 0 and +2.0 into four as four target values, as indicated by the following first, second, third, and fourth target values.

First target value "adjustment value of exposure compensation: +0.5, adjustment value of color density: +0.5"

Second target value "adjustment value of exposure compensation: +1.0, adjustment value of color density: +1.0"

Third target value "adjustment value of exposure compensation: +1.5, adjustment value of color density: +1.5"

Fourth target value "adjustment value of exposure compensation: +2.0, adjustment value of color density: +2.0"

In this embodiment, the target values are calculated by equally dividing the interval between the current adjustment value and its maximum or minimum value. Alternatively, for example, image information such as image sensing information may be acquired, and appropriate adjustment values may be automatically calculated as target values. Also, the number of target values calculated in step S3314 is not limited to four.

In step S3316, the CPU 302 generates and displays thumbnail images by applying image processing using the adjustment values (target values) of the adjustment items calculated in step S3314 to image data which is acquired via the CCD 308 and signal processor 310 when step S3316 is reached. Note that the thumbnail images may be displayed by applying image processing to image data acquired via the CCD 308 and signal processor 310 in real time.

In step S3318, the CPU 302 reads an electrical signal from the CCD 308, and executes the image update processing of an image to be displayed on the display unit 312 as in steps S3002 and S3014 (see FIG. 24).

The CPU 302 determines in step S3320 whether or not the user gives the instruction to end the image sensing mode. If the user give the instruction to end the image sensing mode, the CPU 302 ends the operation of the image processing (image processing program). On the other hand, if the user does not give the instruction to end the image sensing mode, the process advances to step S3322.

The CPU 302 determines in step S3322 whether or not the user gives the instruction to sense an image of an object. If the user gives the instruction to sense an image of an object, the process advances to step S3324. On the other hand, if the user does not give the instruction to sense an image of an object, the process advances to step S3326.

In step S3324, the CPU 302 executes the image sensing processing for sensing an image of an object as in steps S3008 and S3020 (see FIG. 25).

The CPU 302 determines in step S3326 whether or not the user selects one of the plurality of thumbnail images displayed on a thumbnail display area 344 on the navigation window 340 in step S3316. If the user does not select any thumbnail image, the process returns to step S3318. If the user selects one thumbnail image, the process advances to step S3328.

In step S3328, the CPU 302 closes the navigation window 340.

In step S3330, the CPU 302 displays a thumbnail image SI' selected in step S3326 on the image (i.e., the display screen) displayed on the display unit 312, as shown in FIG. 21.

In step S3332, the CPU 302 displays (explicitly expresses) an adjustment value (target value) 334b of the selected thumbnail image SI' to be discriminated from a current adjustment value 334a on an image quality adjustment controller 334, as shown in FIG. 21.

In step S3334, in the image quality adjustment controller 334, the CPU 302 displays (explicitly expresses) an adjustment value 334c before change so as to be discriminated from the current adjustment value 334a and the adjustment value (target value) 334b of the thumbnail image SI', as shown in FIG. 22. As a result, the user can change (adjust) the adjustment value of the adjustment item while comparing it with the adjustment value 334c before change and the current adjustment value 334a. Also, the user can revert the adjustment value of the adjustment item to the adjustment value 334c before the change without memorizing and recording the adjustment value 334c before the change.

In step S3336, the CPU 302 reads an electrical signal from the CCD 308, and executes the image update processing of an image to be displayed on the display unit 312 as in steps S3002 and S3014 (see FIG. 24).

The CPU 302 determines in step S3338 whether or not the user gives the instruction to end the image sensing mode. If the user gives the instruction to end the image sensing mode, the CPU 302 ends the operation of the image processing (image processing program). On the other hand, if the user does not give the instruction to end the image sensing mode, the process advances to step S3340.

The CPU 302 determines in step S3340 whether or not the user gives the instruction to sense an image of an object. If the user gives the instruction to sense an image of an object, the process advances to step S3342. On the other hand, if the user does not give the instruction to sense an image of an object, the process advances to step S3344.

In step S3342, the CPU 302 executes the image sensing processing for sensing an image of an object as in steps S3008 and S3020 (see FIG. 25).

The CPU 302 determines in step S3344 whether or not the user gives the instruction to change a highlighted adjustment item 332a of the plurality of adjustment items 332 displayed on the image. If the user does not give the instruction to change the highlighted adjustment item 332a, the process jumps to step S3348. On the other hand, if the user gives the instruction to change the highlighted adjustment item 332a, the process advances to step S3346.

In step S3346, the CPU 302 changes the highlighted adjustment item 332a in accordance with the instruction in step S3344.

The CPU 302 determines in step S3348 whether or not the user changes the adjustment value 334a on the image quality adjustment controller 334 of the highlighted adjustment item 332a. If the user does not give the instruction to change the adjustment value 334a on the image quality adjustment controller 334 of the highlighted adjustment item 332a, the process jumps to step S3352. On the other hand, if the user changes the adjustment value 334a on the image quality adjustment controller 334 of the highlighted adjustment item 332a, the process advances to step S3350.

In step S3350, the CPU 302 changes the adjustment value of the highlighted adjustment item 332a in accordance with the instruction in step S3348.

The CPU 302 determines in step S3352 whether or not the user gives the instruction to execute automatic adjustment of the adjustment value of the adjustment item. If the user does not give the instruction to execute the automatic adjustment of the adjustment value of the adjustment item, the process jumps to step S3356. On the other hand, if the user gives the instruction to execute the automatic adjustment of the adjustment value of the adjustment item, the process advances to step S3354.

In step S3354, the CPU 302 automatically adjusts the adjustment value of the adjustment item. More specifically, the CPU 302 changes (adjusts) the current adjustment value to the adjustment value of the thumbnail image selected in step S3326 (i.e., the adjustment value (target value) of the adjustment item calculated in step S3314).

The CPU 302 determines in step S3356 whether or not the current adjustment value is equal to the target value. If the current adjustment value is not equal to the target value, the process jumps to step S3360. On the other hand, if the current adjustment value is equal to the target value, the process advances to step S3358.

In step S3358, the CPU 302 notifies the user that the current adjustment value is equal to the target value by, for example, flickering the adjustment value (target value) 334b of the thumbnail image SI' on the image quality adjustment controller 334. As a result, the user can recognize that the current adjustment value is the one with which the same image quality as that of the thumbnail image that has undergone the image processing using that adjustment value is obtained.

The CPU 302 determines in step S3360 whether or not the user gives the instruction to end the navigation image quality adjustment processing. If the user does not give the instruction to end the navigation image quality adjustment processing, the process returns to step S3336. On the other hand, if the user gives the instruction to end the navigation image quality adjustment processing, the process advances to step S3362.

In step S3362, the CPU 302 clears the plurality of adjustment items 332 displayed on the image, and ends the navigation image quality adjustment processing. Note that the image quality adjustment controller 334 used to change (adjust) the adjustment value of the highlighted adjustment item 332a is also cleared upon clearing the plurality of adjustment items 332.

As described above, according to the third embodiment, even when the image sensing apparatus 200 is in the image sensing mode, the user is navigated through the path of the adjustment item to be adjusted and processing associated with a change of the adjustment value of that adjustment item according to the image quality adjustment goal of the image. Also, the image quality can be adjusted while relatively comparing the current adjustment value, target value, and adjustment value before change. Therefore, even a user inexperienced in adjustment of the image quality of an image can easily and efficiently accomplish it.

Other Embodiments

The present invention is also achieved when a recording medium that records a program of software which implements the aforementioned embodiments is supplied to a system or apparatus, and a computer (CPU or MPU) of that system or apparatus reads out and executes the program recorded in the recording medium. In this case, the program itself read out from the recording medium implements the functions of the aforementioned embodiments, and the recording medium that records the program constitutes one aspect of the present invention.

As the recording medium that records the program, for example, a flexible disk, hard disk, optical disk, magneto-optical disk, CD-ROM, CD-R, magnetic tape, nonvolatile memory card, ROM, and DVD can be used.

The program that implements the aforementioned embodiments may use the functions of an OS (Operating System) which runs on the computer. Therefore, the present invention includes a case in which the OS executes some or all of actual processes, thereby implementing the aforementioned embodiments.

Furthermore, some functions of the program that implements the aforementioned embodiments may be implemented by firmware of an expansion board or the like attached to a computer, or that program may be executed by a CPU equipped on the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120762 filed on May 2, 2008, which is hereby incorporated by reference herein in its entirety.

What is claimed is:

1. An image processing apparatus comprising:
a slider display unit configured to display a slider used to change an adjustment value used upon execution of image processing of image data, at a position indicating a current adjustment value on a slider bar;
a moving unit configured to move the slider on the slider bar in response to an operation by a user to change the adjustment value;
a thumbnail image display unit configured to display a plurality of thumbnail images obtained by reducing results of image processing of the image data using a plurality of predetermined values;
a selection unit configured to select at least one of the plurality of thumbnail images; and
a target value display unit configured to display, on the slider bar, a position indicating a target value which is used in the image processing for obtaining the selected thumbnail image, to be discriminated from the slider,
wherein the slider display unit displays the slider by a different appearance in accordance with whether or not the slider is moved to the position indicating the target value on the slider bar.

2. The apparatus according to claim 1, further comprising:
a text selection unit configured to select text data indicating a goal image processing; and
an obtaining unit configured to obtain the plurality of predetermined target values in accordance with the selected text data,
wherein said thumbnail image display unit displays the plurality of thumbnail images obtained by reducing results of image processing of the image data using the obtained plurality of predetermined target values.

3. The apparatus according to claim 1, wherein said target value display unit displays the position indicating the target value in the same display style as the selected thumbnail image.

4. The apparatus according to claim 1, wherein said slider display unit displays the slider bars in correspondence with adjustment items.

5. The apparatus according to claim 1, further comprising:
a preview image display unit configured to display a preview image indicating a result of imaging processing of the image data using the current adjustment value corresponding to a position of the slider on the slider bar while updating the preview image, in response to movement of the slider by said moving unit.

6. The apparatus according to claim 5, further comprising:
an initial value display unit configured to display a position indicating an initial value which is an adjustment value before change of the adjustment value by said moving unit on the slider bar to be discriminated from the slider and the position indicating the target value.

7. The apparatus according to claim 1,
wherein said selection unit selects a plurality of thumbnail images, and
wherein said target value display unit displays a plurality of positions indicating a plurality of target values corresponding to the selected thumbnail images to have different display style.

8. The apparatus according to claim 1, wherein said slider display unit displays the slider with flickering, if the slider is moved to the position indicating the target value on the slider bar.

9. A method of changing an adjustment value of image processing, comprising the steps of:
displaying a slider used to change an adjustment value used upon execution of image processing of image data, at a position indicating a current adjustment value on a slider bar;
moving the slider on the slider bar in response to an operation by a user to change the adjustment value;
displaying a plurality of thumbnail images obtained by reducing results of image processing of the image data using a plurality of predetermined values;
selecting at least one of the plurality of thumbnail images; and
displaying, on the slider bar, a position indicating a target value which is used in the image processing for obtaining the selected thumbnail image, to be discriminated from the slider,
wherein the displaying step of the slider displays the slider by a different appearance in accordance with whether or not the slider is moved to the position indicating the target value on the slider bar.

10. A non-transitory recording medium recording a program for making a computer execute a method of changing an adjustment value of image processing, the program making the computer execute the steps of:
displaying a slider used to change an adjustment value used upon execution of image processing of image data, at a position indicating a current adjustment value on a slider bar;
moving the slider on the slider bar in response to an operation by a user to change the adjustment value;
displaying a plurality of thumbnail images obtained by reducing results of image processing of the image data using a plurality of predetermined values;
selecting at least one of the plurality of thumbnail images; and
displaying, on the slider bar, a position indicating a target value which is used in the image processing for obtaining the selected thumbnail image, to be discriminated from the slider, wherein the displaying step of the slider displays the slider by a different appearance in accordance with whether or not the slider is moved to the position indicating the target value on the slider bar.

* * * * *